(12) United States Patent
Ichikawa

(10) Patent No.: US 7,510,515 B2
(45) Date of Patent: Mar. 31, 2009

(54) PACKAGING BAG AND METHOD FOR MANUFACTURING SAME

(75) Inventor: Tooru Ichikawa, Chiyoda-ku (JP)

(73) Assignee: Hosokawa Yoko Co., Ltd., Tokyo (JP)

( * ) Notice: Subject to any disclaimer, the term of this patent is extended or adjusted under 35 U.S.C. 154(b) by 0 days.

(21) Appl. No.: 11/346,380

(22) Filed: Feb. 3, 2006

(65) Prior Publication Data

US 2006/0154793 A1 Jul. 13, 2006

Related U.S. Application Data

(62) Division of application No. 10/701,522, filed on Nov. 6, 2003, now abandoned.

(30) Foreign Application Priority Data

Nov. 27, 2002 (JP) ............................. 2002-343845

(51) Int. Cl.
B31B 1/64 (2006.01)
B31B 49/04 (2006.01)

(52) U.S. Cl. .................. 493/202; 493/193; 493/196; 493/201; 493/218; 493/254; 493/267

(58) Field of Classification Search ................. 493/186, 493/189, 193, 194, 195, 196, 198, 199, 200, 493/201, 202, 210, 217–219, 254, 267
See application file for complete search history.

(56) References Cited

U.S. PATENT DOCUMENTS

| 2,330,015 | A |   | 9/1943 | Stokes | 229/55 |
|---|---|---|---|---|---|
| 2,766,926 | A |   | 10/1956 | Thompson | 363/98 |
| 2,815,898 | A |   | 12/1957 | Thompson | 383/104 |
| 2,869,772 | A | * | 1/1959 | Williams | 383/114 |
| 2,936,940 | A |   | 5/1960 | Berghgracht | 383/104 |
| 3,051,103 | A | * | 8/1962 | Williams | 156/93 |
| 3,332,324 | A | * | 7/1967 | Lehmacher et al. | 493/197 |
| 3,568,918 | A |   | 3/1971 | Blomqvist | 383/109 |
| 3,896,991 | A |   | 7/1975 | Kozlowski et al. | 229/55 |
| 4,014,252 | A |   | 3/1977 | Saito | 93/35 R |
| 4,082,216 | A |   | 4/1978 | Clarke | 229/55 |
| 4,898,477 | A |   | 2/1990 | Cox et al. | 383/33 |
| 4,913,693 | A | * | 4/1990 | Ball et al. | 493/194 |
| 5,059,036 | A | * | 10/1991 | Richison et al. | 383/61.2 |
| 5,184,896 | A |   | 2/1993 | Hammond et al. | 383/33 |
| 5,662,576 | A | * | 9/1997 | Sprehe et al. | 493/195 |
| 5,957,824 | A | * | 9/1999 | Lerner et al. | 493/267 |

(Continued)

FOREIGN PATENT DOCUMENTS

AU 510 262 6/1980

(Continued)

Primary Examiner—Christopher Harmon
(74) Attorney, Agent, or Firm—Steptoe & Johnson LLP

(57) ABSTRACT

A packaging bag comprises a main bag body and a framework member. The main bag body is made of plastic film material through a main bag body formation process. The main bag body has an opening and a plurality of heat sealed portions. The framework member is disposed in the main bag body. The framework member is joined to the main bag body prior to completion of the main bag body formation process. The framework member is foldable/unfoldable together with the main bag body, to enable the framework member and the main bag body to be shifted between a generally flat collapsed state and an expanded state.

4 Claims, 15 Drawing Sheets

U.S. PATENT DOCUMENTS

| | | | |
|---|---|---|---|
| 6,083,584 A | 7/2000 | Smith et al. | 428/35.2 |
| 6,090,028 A * | 7/2000 | Yannuzzi, Jr. | 493/189 |
| 6,132,351 A | 10/2000 | Lotto et al. | 493/210 |
| 6,298,983 B1 * | 10/2001 | Yeager | 206/204 |
| 6,334,710 B1 | 1/2002 | Kuge et al. | 383/104 |
| 6,908,422 B2 | 6/2005 | Ichikawa et al. | 493/186 |
| 6,986,377 B2 * | 1/2006 | Johnson et al. | 156/581 |
| 2002/0147090 A1 * | 10/2002 | Kuge et al. | 493/162 |

FOREIGN PATENT DOCUMENTS

| | | |
|---|---|---|
| DE | 24 37 670 | 2/1976 |
| GB | 654460 | 6/1951 |
| JP | 402004651 | 2/1993 |
| JP | 2001-322187 | 11/2001 |
| WO | WO 01/92111 A1 | 12/2001 |

* cited by examiner

PACKAGING BAG AND METHOD FOR MANUFACTURING SAME

This application is a divisional of application Ser. No. 10/701,522, filed Nov. 6, 2003, now abandoned.

BACKGROUND OF THE INVENTION

1. Field of the Invention

The present invention relates to a packaging bag in which a main bag body can be kept in a prescribed shape by means of a framework member, and to a method for manufacturing such a packaging bag.

2. Description of the Related Art

There have conventionally been various kinds of packaging bags made of plastic film material. There has recently been a strong demand to cause such a packaging bag to receive products such as teabags having predetermined shapes, without collapsing their shapes. The applicant has pursued the development of a packaging bag in response to the above-mentioned demand. Such a packaging bag is composed of a main bag body made of plastic film material and a sleeve disposed therein. The sleeve is foldable/unfoldable and is inserted into the main bag body from an opening thereof. Accordingly, the sleeve received in the main bag body is foldable/unfoldable together with the main bag body, to enable the sleeve and the main bag body to be shifted between a generally flat collapsed state and an expanded state. Japanese Laid-Open Patent Application No. 2001-322187 discloses such a packaging bag and technical effects provided by it.

In the above-mentioned packaging bag, it is essential to place the sleeve having a suitable size to the main bag body in proper position in the main bag body, in order to provide an excellent external appearance of the packaging bag in the expanded state.

However, it is not easy to insert the sleeve having the suitable size into the main bag body from the opening thereof. More specifically, when the length of the opening of the main bag body, which is kept in the collapsed state, is identical to the width of the sleeve, which is also kept in the collapsed state, the total thickness of the collapsed sleeve makes it difficult to insert the sleeve into the main bag body, because of no existence of gusset. In case where the main bag body is provided in its opening with a linear fastener, the liner fastener makes the insertion operation of the sleeve more difficult. Such difficulty in insertion operation of the sleeve deteriorates a manufacturing efficiency of the packaging bag, thus leading to an increased manufacturing cost thereof.

It is conceivable to reduce the size of the sleeve in order to facilitate the inserting operation of the sleeve into the main bag body. In this case, the sleeve kept in the expanded state is loosely fitted into the main body kept in the same expanded state to cause a large gap between the sleeve and the main body, thus deteriorating an external appearance of the packaging bag.

SUMMARY OF THE INVENTION

An object of the present invention, which was made to solve the above-described problems, is to provide a packaging bag, which permits to facilitate manufacture thereof, thus reducing the manufacturing cost, and provide an excellent external appearance in an expanded state, as well as a method for manufacturing such a packaging bag.

In order to solve the above-mentioned object, a packaging bag according to the first aspect of the present invention comprises:

a main bag body made of plastic film material through a main bag body formation process, said main bag body having an opening and a plurality of heat sealed portions; and a framework member disposed in said main bag body, said framework member being joined to said main bag body prior to completion of said main bag body formation process, said framework member being foldable/unfoldable together with said main bag body, to enable said framework member and said main bag body to be shifted between a generally flat collapsed state and an expanded state.

The above-mentioned packaging bag may further comprise a linear fastener provided on said opening of said main bag body.

In the above-mentioned packaging bag, said main bag body may have a rectangular shape in a generally flat collapsed state, said main bag body being provided on opposite side edges thereof with a pair of heat-sealed portions.

In the above-mentioned packaging bag, said framework member may comprise a pair of opposite reinforcing sections, each of said reinforcing sections having a rectangular shape having first pair of opposite side edges and second pair of opposite side edges, said first pair of opposite side edges being embedded in said pair of heat-sealed portions.

In the above-mentioned packaging bag, said second pair of opposite side edges may be bonded to said main bag body at other regions than said pair of heat-sealed portions.

In the above-mentioned packaging bag, said framework member may comprise a pair of opposite reinforcing sections, each of said reinforcing sections having a rectangular shape having first pair of opposite side edges and second pair of opposite side edges, said pair of opposite side edges and said second pair of opposite side edges being thermally bonded to said main bag body at other regions than said pair of heat-sealed portions.

In order to solve the above-mentioned object, a method according to the second aspect of the present invention for manufacturing a packaging bag, comprises the steps of:

(a) continuously feeding a single strip of plastic film material for a main bag body in a longitudinal direction, said single strip having opposite half portions between which a longitudinal central line of said single strip exists;

(b) continuously feeding a pair of strips of thin sheet material for a framework member to place said pair of strips for the framework member on a surface of said single strip for the main bag body in predetermined positions of the respective opposite half portions of the single strip;

(c) bonding said pair of strips for the framework member to said single strip for the main bag body in respective opposite half portions thereof;

(d) folding said single strip for the main bag body with said pair of strips for the framework member in two along said longitudinal central line of said single strip for the main bag body to bring one of said opposite half portions of said single strip for the main bag body close to another of said opposite half portions to prepare a folded composite strip so that said pair of strips for the framework member are placed in an inside of said folded composite strip;

(e) thermally bonding said folded composite strip in a perpendicular direction to a longitudinal direction thereof by predetermined intervals to form heat-sealed portions; and (f) cutting each of said heat-sealed portions in two in said perpendicular direction to the longitudinal direction of said folded composite strip, thereby continuously manufacturing a plurality of packaging bags each of which comprises the main bag body and the framework member, which is foldable/unfoldable together with said main bag body, to enable said framework member and said main bag body to be shifted between a generally flat collapsed state and an expanded state.

In the above-mentioned method, said steps (a) to (f) may be carried out on a manufacturing line.

The above-mentioned method may further comprise the step of:

(g) prior to said step (b), forming bending facilitation portions on each of said pair of strips for the framework member so as to extend in a perpendicular direction to a feeding direction of said pair of strips for the framework member.

In the above-mentioned method, said steps (a) to (g) may be carried out on a manufacturing line.

In order to solve the above-mentioned object, a method according to the third aspect of the present invention for manufacturing a packaging bag, comprises the steps of:

(a) continuously feeding a pair of strips of plastic film material for a main bag body in a longitudinal direction so as to be apart from each other;
(b) continuously feeding a pair of strips of thin sheet material for a framework member to place said pair of strips for the framework member on respective inner surfaces of said pair of strips for the main bag body in predetermined positions thereof;
(c) bonding said pair of strips for the framework member to said pair of strips for the main bag body, respectively;
(d) bringing one of said pair of strips for the main bag body close to another of said pair of strips for the main bag body so as to cause said pair of strips for the framework member face each other, thus preparing a set of composite strips;
(e) thermally bonding said set of composite strips in a perpendicular direction to a longitudinal direction thereof by predetermined intervals to form side heat-sealed portions;
(f) thermally bonding said set of composite strips on one of longitudinal edges of said set of composite strips to form a bottom heat-sealed portion; and
(g) cutting each of said side heat-sealed portions in two in said perpendicular direction to the longitudinal direction of said set of composite strips, thereby continuously manufacturing a plurality of packaging bags each of which comprises the main bag body and the framework member, which is foldable/unfoldable together with said main bag body, to enable said framework member and said main bag body to be shifted between a generally flat collapsed state and an expanded state.

In the above-mentioned method, said steps (a) to (g) may be carried out on a manufacturing line.

The above-mentioned method may further comprise the step of:

(h) prior to said step (b), forming bending facilitation portions on each of said pair of strips for the framework member so as to extend in a perpendicular direction to a feeding direction of said pair of strips for the framework member.

In the above-mentioned method, said steps (a) to (h) may be carried out on a manufacturing line.

In order to solve the above-mentioned object, a method according to the fourth aspect of the present invention for manufacturing a packaging bag, comprises the steps of:

(a) preparing a single piece of plastic film material for a main bag body, said single piece having opposite half portions between which a central line of said single piece exists;
(b) placing a pair of pieces of thin sheet material for a framework member on a surface of said single piece for the main bag body in predetermined positions of the respective opposite half portions of the single piece;
(c) bonding said pair of pieces for the framework member to said single piece for the main bag body in respective opposite half portions thereof;
(d) folding said single piece for the main bag body with said pair of pieces for the framework member in two along said central line of said single piece for the main bag body to bring one of said opposite half portions of said single piece for the main bag body close to another of said opposite half portions to prepare a folded composite piece so that said pair of pieces for the framework member are placed in an inside of said folded composite piece; and
(e) thermally bonding said folded composite piece on opposite sides thereof to form heat-sealed portions, thereby manufacturing the packaging bag, which comprises the main bag body and the framework member, which is foldable/unfoldable together with said main bag body, to enable said framework member and said main bag body to be shifted between a generally flat collapsed state and an expanded state.

The above-mentioned method may further comprise the step of:

(f) prior to said step (b), forming bending facilitation portions on each of said pair of pieces for the framework member.

In order to solve the above-mentioned object, a method according to the fifth aspect of the present invention for manufacturing a packaging bag, comprises the steps of:

(a) placing a pair of pieces of plastic film material for a main bag body so as to be apart from each other;
(b) placing a pair of pieces of thin sheet material for a framework member on respective inner surfaces of said pair of pieces for the main bag body in predetermined positions thereof;
(c) bonding said pair of pieces for the framework member to said pair of pieces for the main bag body, respectively;
(d) bringing one of said pair of pieces for the main bag body close to another of said pair of pieces for the main bag body so as to cause said pair of pieces for the framework face each other, thus preparing a set of composite pieces; and
(e) thermally bonding said set of composite pieces at opposite side edges and a bottom edge thereof to form side heat-sealed portions and a bottom heat-sealed portion;

thereby manufacturing the packaging bags, which comprises the main bag body and the framework member, which is foldable/unfoldable together with said main bag body, to enable said framework member and said main bag body to be shifted between a generally flat collapsed state and an expanded state.

The above-mentioned method may further comprise the step of:

(f) prior to said step (b), forming bending facilitation portions on each of said pair of strips for the framework member.

In order to solve the above-mentioned object, a method according to the sixth aspect of the present invention for manufacturing a packaging bag, comprises the steps of:

(a) placing a pair of pieces of plastic film material for a main bag body so as to be apart from each other;
(b) placing a framework member, which is formed into a sleeve, on respective inner surfaces of said pair of pieces for the main bag body in predetermined positions thereof;
(c) bonding said framework member to said pair of pieces for the main bag body, respectively;
(d) bringing one of said pair of pieces for the main bag body close to another of said pair of pieces for the main bag body so as to receive said framework member between said pair of pieces for the main bag body, thus preparing a set of composite pieces; and (e) thermally bonding said set of composite pieces at opposite side edges and a bottom edge thereof to form side heat-sealed portions and a bottom heat-sealed portion;

thereby manufacturing the packaging bags, which comprises the main bag body and the framework member, which is foldable/unfoldable together with said main bag body, to enable said framework member and said main bag body to be shifted between a generally flat collapsed state and an expanded state.

The above-mentioned method may further comprise the step of:

(f) prior to said step (b), forming bending facilitation portions on said framework member.

DETAILED DESCRIPTION OF THE PREFERRED EMBODIMENTS

Embodiments of the present invention will be described below with reference to the drawings.

Figure 1:
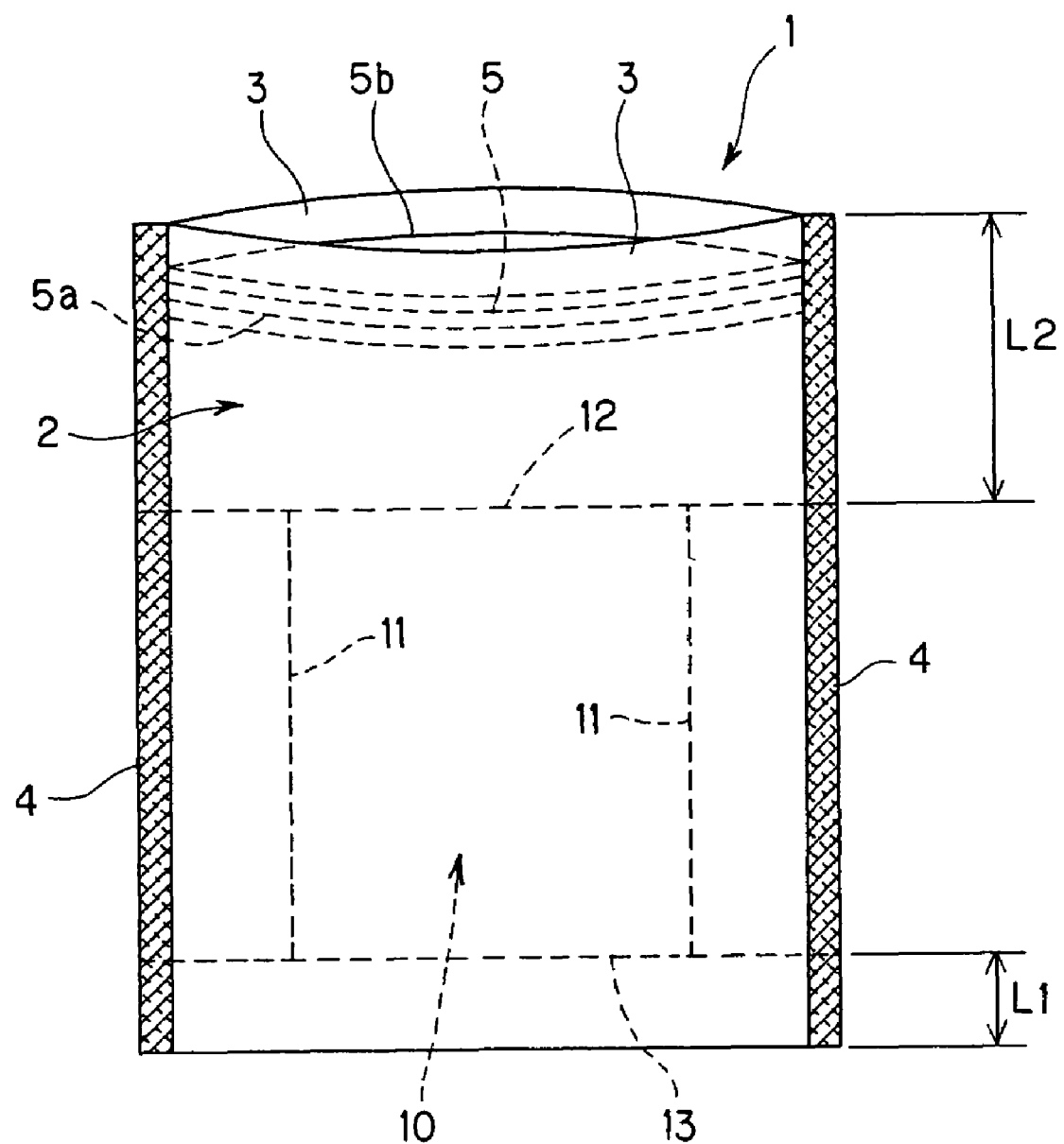
FIG. 1 is a front view of a packaging bag according to an embodiment of the present invention.

FIG. 1 is a front view of a packaging bag 1 according to an embodiment of the present invention. The packaging bag 1 is composed of a main bag body 2 and a framework member 10, which is joined to the main bag body 2 prior to completion of a formation process thereof and is foldable/unfoldable together with the main bag body 2, to enable the framework member 10 and the main bag body 2 to be shifted between a generally flat collapsed state and an expanded state.

More specifically, the main bag body 2 is made of plastic film material through a main bag body formation process in a rectangular shape in a generally flat collapsed state. The main bag body 2 is formed by folding a single rectangular piece of plastic film material for the main bag body in two along the central line to form a pair of opposite panel members 3, 3 and thermally bonding the opposite sides of the thus folded piece to form side heat-sealed portions 4, 4. The main bag body 2 has an opening at an opposite side to the central line along which the above-mentioned piece is folded in two. The main bag body 2 is provided at the opening with a linear fastener 5. The linear fastener 5 is composed of a male member 5a formed on the inner surface of one of the panel members 3, 3 at the above-mentioned opening and a female member 5b formed on the inner surface of the other of the panel members 3, 3 at the opening. The male member 5a can engage with or disengage from the female member 5b so as to close or open the upper end of the main bag body 2.

The framework member 10 is made of thin sheet material such as plastic material or plastic/paper composite material. The framework member 10 is composed of a pair of opposite reinforcing sections, which are thermally bonded to the inner surfaces of the panel members 3, 3. Each of the reinforcing sections has a rectangular shape. The positional determination of the reinforcing section relative to the panel member 3 is made so as to keep a distance "L1" between the lower edge 13 of the reinforcing section and the lower edge of the panel member 3 and a distance "L2" between the upper edge 12 of the reinforcing section and the upper edge of the panel member 3, as shown in FIG. 1. Each of the reinforcing sections has the first pair of opposite side edges (i.e., the right and left hand side edges in FIG. 1) and the second pair of opposite side edges (i.e., the upper and lower side edges in FIG. 1). The length of each of the upper and lower side edges of the reinforcing section is substantially identical to the width of the main bag body 2 so that the right and left hand side edges of the reinforcing section are embedded in the side heat-sealed portions 4, 4. Each of the upper and lower side edges of each of the reinforcing sections is thermally bonded to the inner surface of each of the panel members 3, 3 at the other regions than the side heat-sealed portions 4, 4.

Each of the reinforcing sections of the framework member 10 is provided at positions shifted inward from the right and left hand side edges of the main bag body 2 with a pair of bending facilitation portions 11, 11 extending in parallel with the side heat-sealed portions 4, 4. The bending facilitation portion 11 enables the reinforcing section to be easily bent along it, thus ensuring a folding/unfolding operation of the framework member 10.

Figure 7:
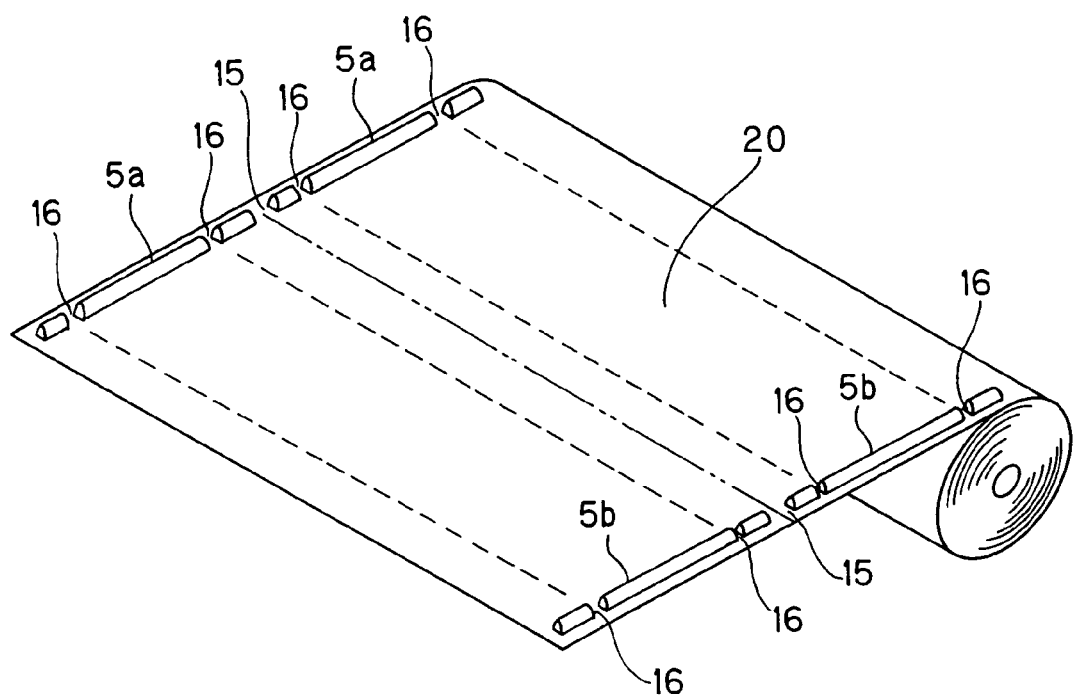
FIG. 7 is a perspective view illustrating a strip of plastic film for forming the main bag body, on which a set of male members and a set of female members for forming a linear fastener are provided while unrolling the strip of plastic film.

The male member 5a of the linear fastener 5 is composed of three sections, i.e., a set of a central main section and opposite side sections, which are placed in line so as to be apart from each other, as shown in FIG. 7. Gaps between the central main section and the opposite side sections are placed so as to correspond to the above-mentioned bending facilitation portions. The female member 5b of the linear fastener 5 is also composed of three sections in the similar manner as the male member 5a. The gaps of each of the male member 5a and the female member 5b enable the main bag body 2 to be easily folded in accordance with the shift of the framework member 10 between the collapsed state and the expanded state.

The main bag body 2 and the framework member 10 are designed so that the height of the framework member 10 is substantially identical to the height of the packaging bag 1, which is shifted to an expanded state and subjected to a bending finishing step to provide a finished product in the form of a rectangular parallelepiped. The framework member 10 is bent at right angles at the bending facilitation portions 11, 11, thus forming the four side corner edges of the rectangular parallelepiped.

Now, description will be given below of the plastic film material for the main bag body 2 and the thin sheet material for the framework member 10.

A plastic laminate film having a plurality of layers is used to form the main bag body 2. There may be used, for example, a laminate film having a layer structure of an oriented polypropylene (OPP) layer having a thickness of 25 μm and a polyethylene (PE) layer having a thickness of 50 μm, which are thermally bonded to each other. In this case, the main bag body 2 is designed so that the oriented polypropylene layer is placed on the inner side of the main bag body 2. It is preferable to add an aluminum layer to the laminate film in order to improve barrier property. In this case, there may be used a laminate film having a layer structure of an oriented polypropylene (OPP) layer having a thickness of 25 μm, an aluminum layer having a thickness of 5 μm, and a polyethylene (PE) layer having a thickness of 50 μm, which are thermally bonded to each other.

A plastic film having a predetermined strength that enables the predetermined shape into which the main bag body 2 is shifted together with the framework member 10 in an expanded state, to be appropriately maintained is used to form the framework member 10. A polyethylene (PE) film having a thickness of 100 μm is for example used for the framework member 10.

Figure 4:
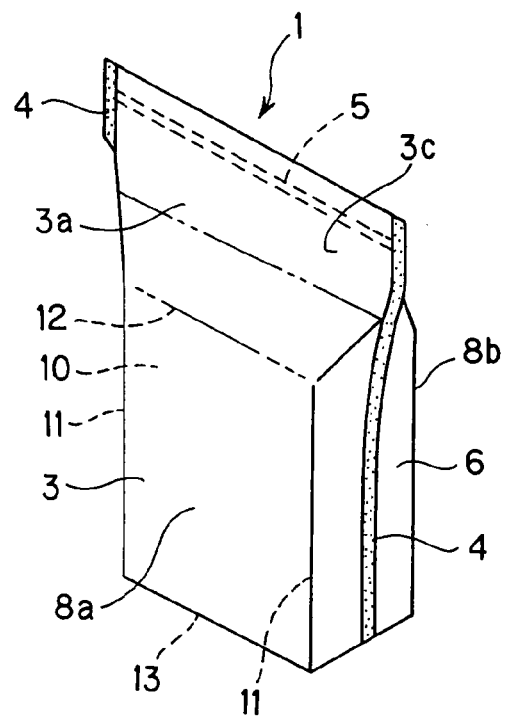
FIG. 4 is a perspective view illustrating the packaging bag provided with the bottom as shown in FIG. 3.
Figure 5:
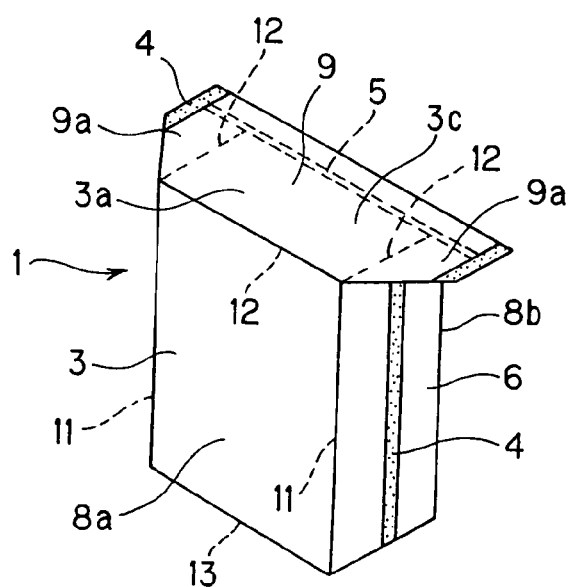
FIG. 5 is a perspective view illustrating the packaging bag in which the upper portion of the main bag body, projecting upward from the upper edge of the framework member is folded into a flat state, after the packaging bag is filled with contents.
Figure 6:
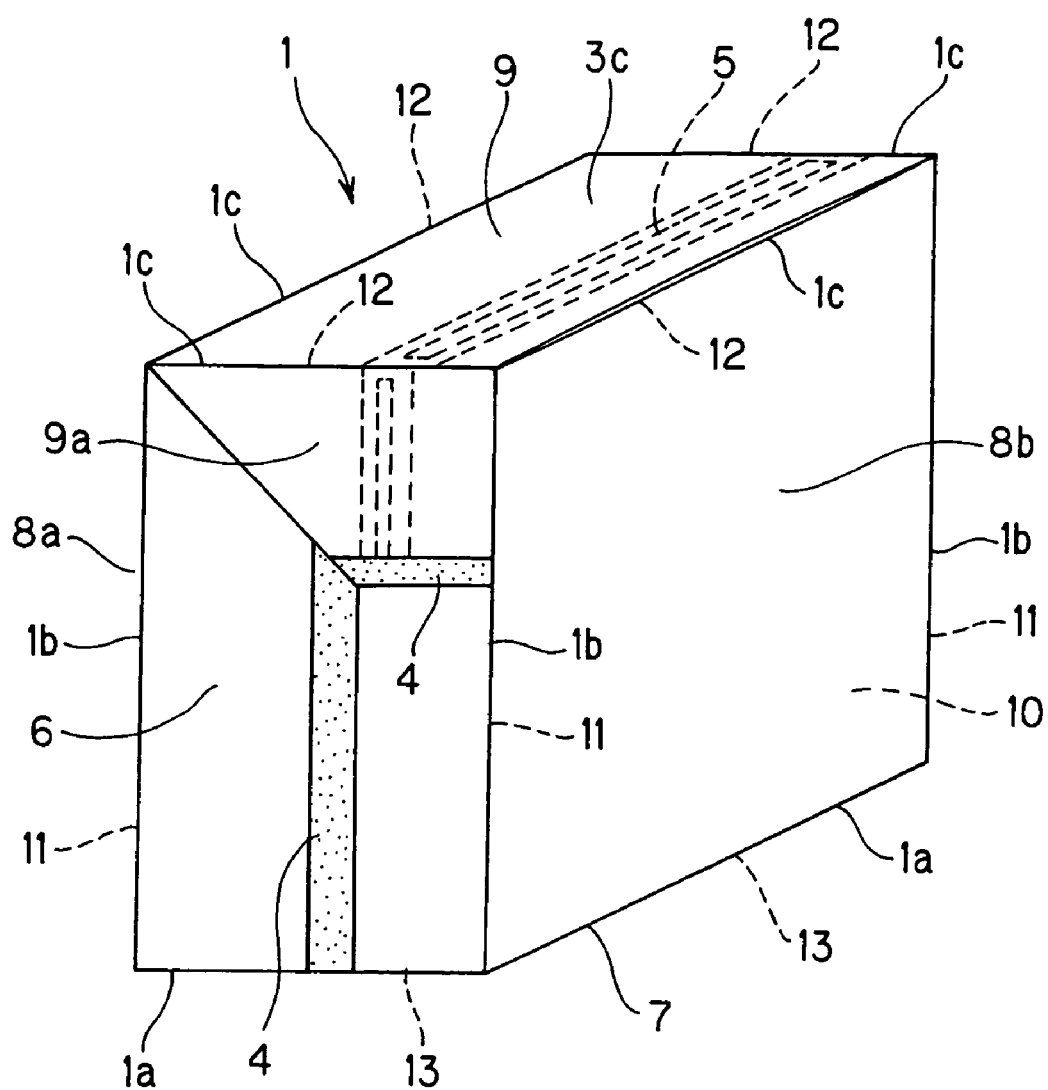
FIG. 6 is a perspective view illustrating the packaging bag in which the opposite edges of the upper portion of the main bag body, projecting horizontally from the upper edge of the framework member as shown in FIG. 5, are further folded so as to come into contact with the opposite sides of the packaging bag, respectively, thus providing a rectangular parallelepiped.

The packaging bag 1 having the above-described structure is shifted from the generally flat collapsed state as shown in FIG. 1 to the expanded finished state as shown in FIG. 6 through the intermediate states as shown in FIGS. 2 to 5.

Figure 2:
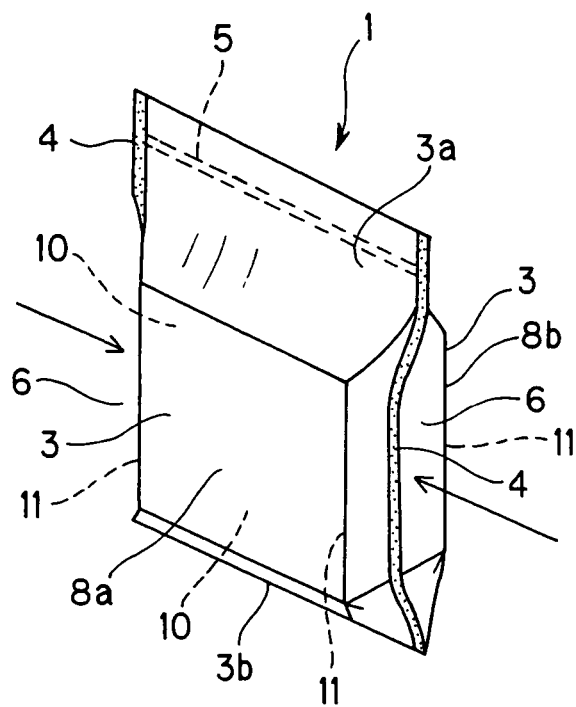
FIG. 2 is a perspective view illustrating the packaging bag in which a framework member is kept in an expanded state and a main bag body is deformed accordingly.

First, the opposite sides of the packaging bag 1, which is kept in the generally flat collapsed state, are pushed inwardly in directions as shown by arrows in FIG. 2, with the result that the pair of opposite reinforcing sections of the framework member 10 are folded at right angles along the bending facilitation portions 11, 11, thus shifting the framework member 10 together with the main bag body 2 from the generally flat collapsed state to the expanded state in the form of sleeve. Such a pushing operation provides opposite front and rear panel portions 8a, 8b, and opposite side panel portions 6, 6. The above-mentioned pushing operation also provides an upper portion 3a, which upwardly projects from the upper edge 12 of the framework member 10, and a lower portion 3b, which downwardly projects from the lower edge 13 of the framework member 10. In such a pushing operation, the side heat-sealed portions 4, 4 are bent rearward.

Figure 3:
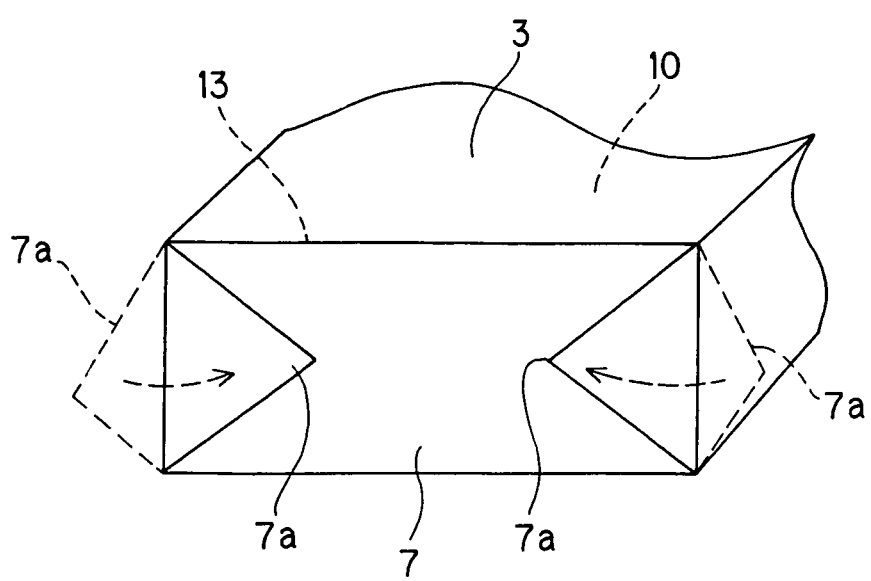
FIG. 3 is a partial perspective view illustrating the packaging bag in which the lower portion of the main bag body, projecting downward from the lower end of the framework member is folded to form a bottom.

Then, the lower portion 3b downwardly projecting from the lower edge 13 of the framework member 10 is folded along the lower edge 13 of the framework member 10 into a flat state so as to provide a pair of triangular portions 7a, 7a extending outwardly and generally horizontally as shown in dotted lines in FIG. 2. The triangular portions 7a, 7a are bent inwardly along the lower edge of the framework member 10 and thermally bonded to the counterpart, as shown in solid lines in FIG. 3, to form a bottom panel portion 7 of the packaging bag 1. Any other suitable bonding may be applicable to the bonding of the triangular portions 7a, 7a, and these portions 7a, 7a may be bonded to the counterpart by a suitable adhesive agent. The folding process of the lower portion 3b of the packaging bag 1 to form the bottom panel portion 7 is completed in this manner. At this stage, the packaging bag 1 is provided on its lower side with the lower portion, which is folded into a box with a flat bottom having a rectangular shape, on its upper side with the upper portion 3a, which upwardly projects from the upper edge of the framework member 10 and is kept in a semi-folded state in which the width of the upper portion 3a of the packaging bag 1 in its plan view gradually increases with its height, as shown in FIG. 4.

Then, the upper portion 3a, which upwardly projects from the upper edge of the framework member 10, is also folded along the upper edge 12 of the framework member 10 into a flat state so as to provide a pair of trapezoidal portions 9a, 9a projecting outwardly and generally horizontally as shown in FIG. 5. In such a folding operation, the opening of the packaging bag 1, which is closed by the linear fastener 5, is brought close to the rear panel portion 8b.

The above-mentioned pair of trapezoidal portions 9a, 9a is bent downwardly along the upper edge of the framework member 10 and thermally bonded to the opposite side panel portions 6, 6, respectively, thus providing a finished product, as shown in FIG. 6. The folding process of the upper portion 3a of the packaging bag 1 to form the top panel portion 9 is completed in this manner. Any other suitable bonding may be applicable to the bonding of the trapezoidal portions 9a, 9a, and these portions 9a, 9a may be bonded to the opposite side panel portions 6, 6 by a suitable adhesive agent. Of course, the above-mentioned folding process is carried out after the packaging bag 1 is filled with contents.

The packaging bag 1, which is shifted from the generally flat collapsed state to the expanded state, this providing an external appearance of the box, has the opposite front and rear panel portions 8a, 8b, which face in parallel with each other, the side panel portions 6, 6, which also face in parallel with each other on the opposite sides of the front and rear panel portions 8a, 8b, the bottom panel portion 7 that has been formed by folding the bottom portion 3b of the packaging bag 1 in the flat state, and the top panel portion 9 that has been formed by folding the upper portion 3a of the packaging bag 1 in the flat state. The height of each of the front and rear panel portions 8a, 8b and the side panel portions 6, 6 is substantially identical to the height of the framework member 10, which is provided in the packaging bag 1. More specifically, the lower edge 13 of the framework member 10 forms the corners 1a, 1a, 1a, 1a between the front, rear and side panel portions 8a, 8b, 6, 6 and the bottom panel portion 7, on the one hand, and the upper edge 12 of the framework member 10 forms the corners 1c, 1c, 1c, 1c between the front, rear and side panel portions 8a, 8b, 6, 6 and the top panel portion 9, on the one hand. In addition, the bent portions of the framework member 10, which are provided by bending the framework member 10 along the bending facilitation portions 11, form the corners 1b, 1b, 1b, 1b between the front and rear panel portions 8a, 8b and the side panel portions 6, 6.

The packaging bag 1 can be shifted from the generally flat collapsed state to the expanded state and then subjected to the folding processes to convert into a box shape, which corresponds to the framework member 10 kept in the expanded state. Accordingly, it is possible to receive products such as teabags having the predetermined shape in the packaging bag 1 kept in the expanded state, without collapsing their shapes. The linear fastener 5, which is provided at the opening of the packaging bag 1, makes the packaging bag 1 reclosable even after opening the packaging bag 1.

In the above-described packaging bag 1 of the embodiment of the present invention, each of the upper and lower side edges of each of the reinforcing sections of the framework member 10 is thermally bonded to the inner surface of each of the panel members, 3, 3 at the other regions than the side heat-sealed portions 4, 4. However, the upper and lower side edges of each of the reinforcing sections of the framework member 10 is may not necessarily bonded to the inner surface of each of the panel members 3, 3 at the other regions than the side heat-sealed portions 4, 4, in case where a proper contact state of the reinforcing sections with the inner surface of the panel members 3, 3 can be ensured, or an existence of a possible gap between the reinforcing sections and the panel members 3, 3 cause no problem in a filling operation of the packaging bag 1 with contents.

The above-described packaging bag 1 of the embodiment of the present invention is provided with the linear fastener 5. Such a linear fastener may be omitted, as an occasion demands.

Now, a method of the first embodiment of the present invention for manufacturing the above-described packaging bag 1 will be described below with reference to FIGS. 7 to 12.

In the first embodiment of the method of the present invention, the single strip 20 for the main bag body 2 and the pair of strips 30, 30 for the framework member 10 are used to manufacture the plurality of packaging bags 1.

More specifically, the method for manufacturing the packaging bag 1 includes the essential steps of:

(1-a) continuously feeding a single strip 20 of plastic film material for the main bag body 2 in a longitudinal direction, the single strip 20 having opposite half portions between which a longitudinal central line of the single strip 20 exists;

(1-b) continuously feeding a pair of strips 30, 30 of thin sheet material for the framework member 10 to place the pair of strips 30, 30 for the framework member 10 on a surface of the single strip 20 for the main bag body 2 in predetermined positions of the respective opposite half portions of the single strip 20;

(1-c) bonding the pair of strips 30, 30 for the framework member 10 to the single strip 20 for the main bag body 2 in respective opposite half portions thereof;

(1-d) folding the single strip 30 for the main bag body 3 with the pair of strips 30, 30 for the framework member 10 in two along the longitudinal central line of the single strip 20 for the main bag body 2 to bring one of the opposite half portions of the single strip 20 for the main bag body 2 close to another of the opposite half portions to prepare a folded composite strip so that the pair of strips 30, 30 for the framework member 10 are placed in an inside of the folded composite strip;

(1-e) thermally bonding the folded composite strip in a perpendicular direction to a longitudinal direction thereof by predetermined intervals to form heat-sealed portions 4•••4; and (1-f) cutting each of the heat-sealed portions 4•••4 in two in the perpendicular direction to the longitudinal direction of the folded composite strip, and further includes optional steps of:

(1-g) prior to the step (1-b), forming bending facilitation portions 11•••11 on each of the pair of strips 30, 30 for the framework member so as to extend in the perpendicular direction to the feeding direction of the pair of strips 30, 30 for the framework member 10; and (1-h) during the step (1-a), providing a set of male members 5a and a set of female members 5b in each of the respective consecutive regions for the packaging bags on the single strip for the main bag body 2.

First, the step (1-a) is carried out to unroll the single strip 20 of plastic film material for the main bag body 2 to continuously feed it in the longitudinal direction. The single strip 20 has the opposite half portions between which the longitudinal central line of the single strip 20 exists. The layer structure of the single strip 20 of plastic film material for the main bag body 2 is the same as that of the main bag body 2 of the packaging bag 1 of the present invention as described above and description of the layer structure is therefore omitted.

The step (1-h) is carried out to continuously provide a plurality of sets of male members 5a and a plurality of corresponding sets of female members 5b on the longitudinal opposite side edge portions of the upper surface of the single strip 20 for the main bag body 2, so as to form these members 5a, 5b integrally with the single strip 20 through an insert injection. A gap 15 exists between the adjacent sets of male members 5a and another gap 15 also exists between the adjacent sets of female members 5b corresponding to the above-mentioned gap 15. The corresponding gaps 15, 15 are placed on the same two-dot chain straight line as shown in FIG. 7, which is perpendicular to the feeding direction of the single strip 20 for the main bag body 2. The single strip 20 will be cut along the above-mentioned straight line into pieces for the respective main bodies 2. Each set of male members 5a is composed of a central main section and opposite side sections, which are placed in line so as to be apart from each other, as shown in FIG. 7. Gaps 16•••16 between the central main section and the opposite side sections are placed so as to correspond to the bending facilitation portions 11•••11 as described later. Each set of female members 5b is also composed of three sections in the similar manner as the set of male members 5a. The set of male members 5a can be engaged with or removed from the set of female members 5b.

Figure 8:
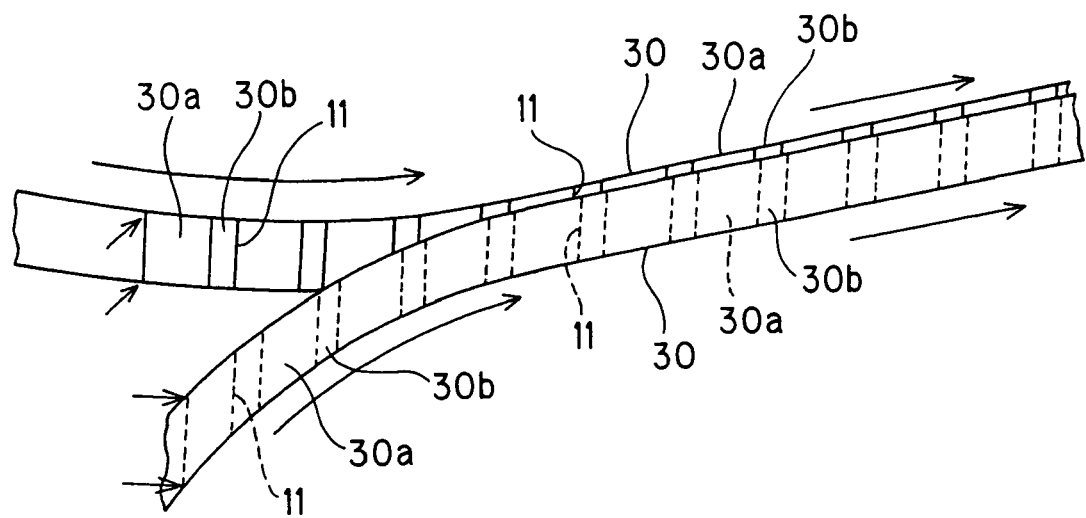
FIG. 8 is a schematic perspective view illustrating a pair of strips of plastic film material for forming the framework member, which are subjected to a bending facilitation portion forming step to form bending facilitation portions thereon and then traveled so as to face each other.

The step (1-b) is carried out to unroll the pair of strips 30, 30 for the framework member 10 from a pair of rolls, which is disposed on the left-hand side of FIG. 8, but not shown therein, to continuously feed them in their longitudinal directions to place them on the surface of the single strip 20 for the main bag body 2 in the predetermined positions of the respective half portions.

More specifically, the strips 30, 30 for the framework member 10 are unrolled at the different positions from each other and fed together in a prescribed zone, thus traveling in parallel with each other in their longitudinal directions. Before the pair of strips 30, 30 for the framework member 10 reaches the above-mentioned prescribed zone, the step (1-g) is carried out to form the bending facilitation portions 11•••11 on the opposite inner surfaces of the pair of strips 30, 30 for the framework member 10 so as to extend in the perpendicular direction to the feeding direction of the pair of strips 30, 30 for the framework member 10. The bending facilitation portions 11•••11 are classified into a plurality of pairs of bending facilitation portions 11, 11, which are placed so as to be apart from each other by a predetermined distance in the feeding direction of the pair of strips 30, 30 for the framework member 10. The adjacent pairs of bending facilitation portions 11, 11, 11, 11 are placed so as to be apart from each other by a smaller distance than the above-mentioned predetermined distance. The pair of strips 30, 30 is cut, as mentioned later, along the respective central lines between the adjacent pairs of bending facilitation portions into pieces of a plurality of sets of reinforcing sections. Each of the reinforcing sections is composed of (i) a central portion defined by the pair of bending facilitation portions 11, 11 and (ii) opposite side portions extending from the respective bending facilitation portions 11, 11.

The pair of reinforcing sections is used for the single packaging bag 1 so that the central portions of the pair of reinforcing sections define the opposite front and rear panel portions 8a, 8b of the packaging bag 1 as shown in FIG. 6, respectively, and the combinations of the corresponding side portions of the pair of reinforcing sections define the side panel portions 6, 6 of the packaging bag 1, respectively.

Figure 9:
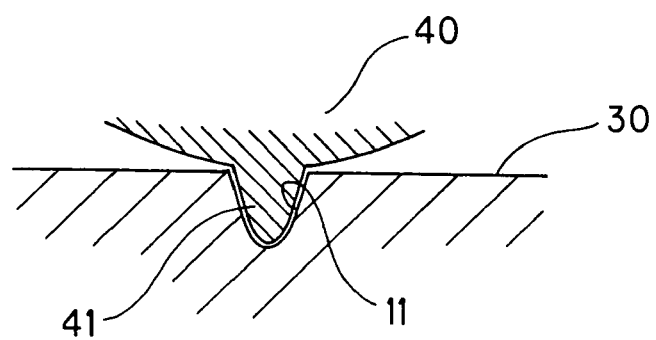
FIG. 9 is a partial cross-sectional view illustrating a roller having a projection, which is used to carry out the bending facilitation portion forming step and a resultant bending facilitation portion formed on the strip of plastic film by means of the projection.

FIG. 9 shows a typical device for carrying out the above-mentioned step (1-g) to form the bending facilitation portions 11•••11 on each of the pair of strips 30, 30 for the framework member 10. The device is composed of a roller 40 provided with a projection 41 formed on the periphery thereof. The projection 41 extends over the roller 40 in its longitudinal direction. The central axis of the roller 40 is perpendicular to the feeding direction of the strip 30 for the framework member 10. A base plate (not shown) is disposed so as to face the roller 40 and extend along it in its longitudinal direction. The distance between the base plate and the outer peripheral surface of the roller 40 is substantially identical or smaller than the thickness of the strip 30 for the framework member 10. The above-mentioned base plate may be substituted by another roller having no projection.

The strip 30 passes through between the base plate and the roller 40 to dig the projection 41 into the strip 30, thus forming a groove serving as the bending facilitation portion 11, which extends in the perpendicular direction to the feeding direction of the strip 30. A set of rollers, i.e., the above-mentioned roller 40 and the other roller having the same structure, which are disposed so as to be away from each other by a predetermined distance, are utilized to form the above-described plurality of pairs of bending facilitation portions 11•••11 on one of the pair of strips 30, 30 for the framework member 10. The other set of rollers having the same structure are utilized to form the plurality of pairs of bending facilitation portions 11•••11 on the other of the pair of strips 30, 30 for the framework member 10. According to these sets of rollers, it is possible to continuously form the plurality of pairs of bending facilitation portions 11•••11 on the pair of strips 30, 30 for the framework member 10, without halting the feeding of the strips 30, 30.

The device for carrying out the step (1-g) is not limited only to the above-mentioned roller type. For example, an elongated pushing block having a longitudinal edge may be used to form the bending facilitation portions 11•574 •11 on the strip 30 for the framework member 10. In this case, the feeding of the strip 30 is intermittently halted and the pushing block is pressed against the strip 30 to form the bending facilitation portion 11 during the halting period of time.

The pair of strips 30, 30 for the framework member 10, on which the bending facilitation portions 11•••11 have been formed by carrying out the step (1-g), is continuously fed, during the step (1-b), to place them on the inner surface of the single strip 20 for the main bag body 2 in the respective opposite half portions thereof.

The step (1-c) is carried out to thermally bond the pair of strips 30, 30 at the respective opposite longitudinal edges thereof to the single strip 20 for the main bag body 2 in respective opposite half portions thereof.

Figure 10:
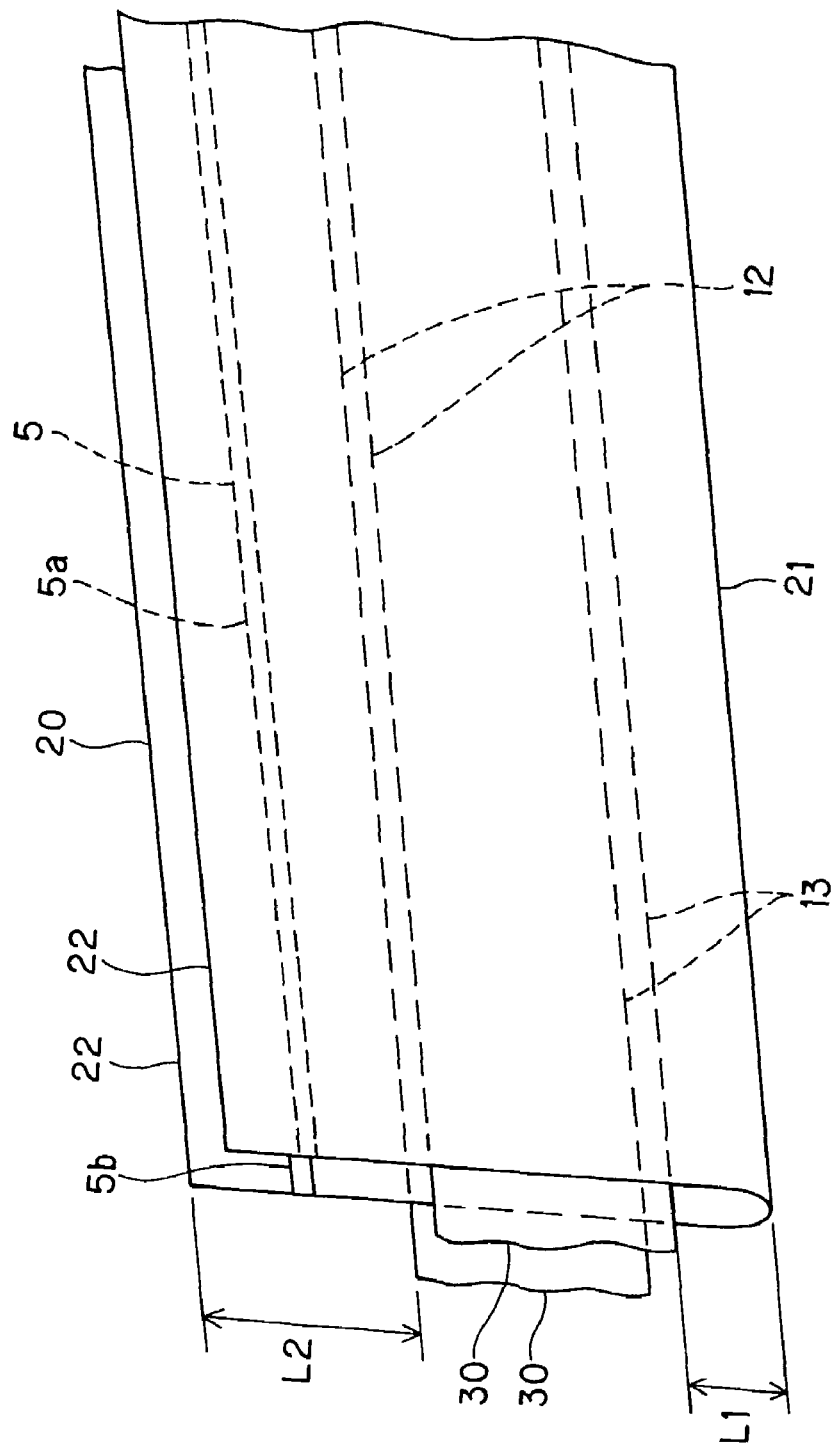
FIG. 10 is a schematic perspective view illustrating a step for folding the single strip for the main bag body with the pair of strips for the framework member in two along the longitudinal central line of the single strip for the main bag body.

Then, the step (1-d) is carried out to fold the single strip 30 for the main bag body 3 with the pair of strips 30, 30 for the framework member 10 in two along the longitudinal central line of the single strip 20 for the main bag body 2 to bring one of the opposite half portions of the single strip 20 for the main bag body 2· close to another of the opposite half portions to prepare a folded composite strip so that the pair of strips 30, 30 for the framework member 10 are placed in an inside of the folded composite strip, as shown in FIG. 10. In the step (1-d), the set of male members 5a is engaged with the set of the female members 5b. Of course, the step (1-d) may be carried out, while conducting the steps (1-a), (1-b) and (1-c).

As is clear from FIG. 10, the positional determination of each of the strips 30, 30 relative to the folded composite strip is made so as to keep a distance "L1" between the lower edge 13 of the folded composite strip and the lower edge of each of the strips 30, 30 and a distance "L2" between the upper edge 12 of the each of the strips 30. 30 and the upper edge of the folded composite strip. The lower portion of the folded composite strip, which corresponds to the distance "L1", is used to form the bottom panel portions 7 of the packaging bags 1, as shown in FIG. 3. The upper portion of the folded composite strip, which corresponds to the distance "L2", is used to form the top panel portions 9 of the packaging bags 1, as shown in FIG. 6.

Figure 11:
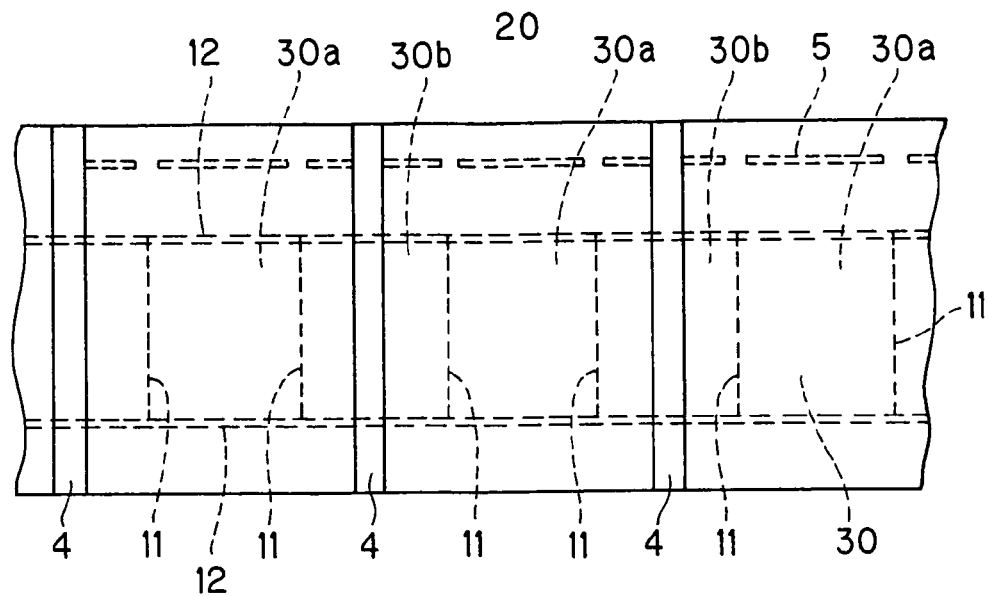
FIG. 11 is a schematic descriptive view illustrating a step for thermally bonding a folded composite strip of the single strip for the main bag body and the pair of strips for the framework member in a perpendicular direction to a longitudinal direction thereof by predetermined intervals to form heat-sealed portions.
Figure 12:
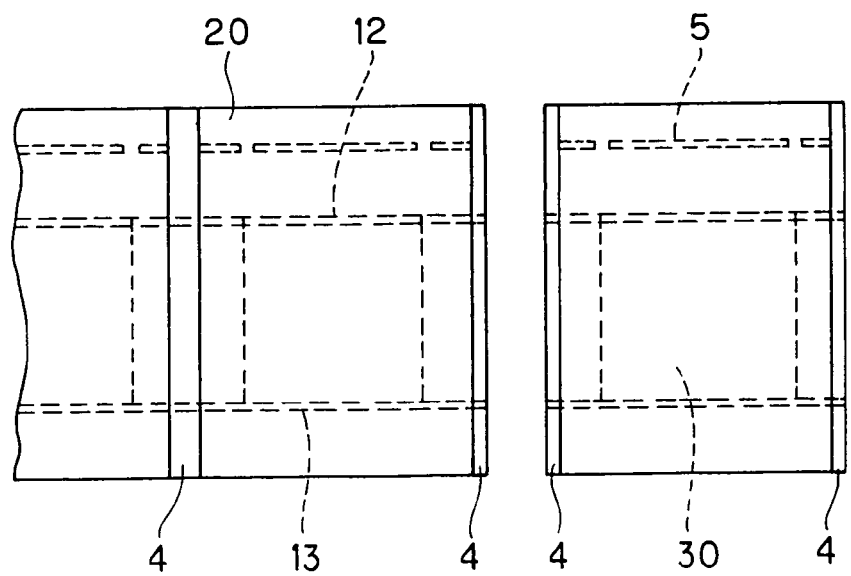
FIG. 12 is a schematic descriptive view illustrating a step for cutting each of the heat-sealed portions in two in the perpendicular direction to the longitudinal direction of the folded composite strip.

The step (1-e) is carried out to thermally bond the folded composite strip in a perpendicular direction to the longitudinal direction thereof by predetermined intervals to form heat-sealed portions 4•••4, as shown in FIG. 11. Such a thermal bonding process is conducted with the use of a heat-sealing plate, which is brought into contact with the outer surface of the folded composite strip. The portions of the folded composite strip, to which the thermal bonding process is to be applied, correspond to the respective central lines between the adjacent pairs of bending facilitation portions 11, 11, 11, 11 as described above.

Then, the step (1-f) is carried out to cut each of the heat-sealed portions 4•••4 in two in the perpendicular direction to the longitudinal direction of the folded composite strip, thereby continuously manufacturing the plurality of packaging bags 1. In each of the packaging bags 1, the opposite side edges of the reinforcing section, which are in parallel with the bending facilitation portions 11, 11 are embedded in the heat sealed portions 4, 4.

In the above-described method of the present invention, the steps (1-a) to (1-h) are carried out on the manufacturing line. The steps (1-a) to (1-h) may however be carried out independently each other on the different manufacturing lines.

In the above-described method of the present invention, each of the bending facilitation portions 11•••11 provided by the step (1-g) is formed into a groove. The bending facilitation portion 11 may have any other structure that enables the reinforcing section, which is obtained by cutting the strip 30, to be easily bent along the bending facilitation portion 11. The bending facilitation portion 11 may for example be provided in the different form for example of perforations.

In the above-described method of the present invention, the insert injection is applied to carry out the step (1-h). The male members 5a and the female members 5b, which have been previously formed through extrusion, may however be bonded to the single strip 20 for the main bag body 2.

The above-described method of the present invention includes the step (1-h) to provide the sets of male members 5a and the sets of female members 5b on the single strip 20 for the main bag body 2. The step (1-h) may however be omitted, as an occasion demands.

Now, the method of the second embodiment of the present invention for manufacturing the above-described packaging bag 1 will be described below with reference to FIGS. 13 to 17.

Figure 13:
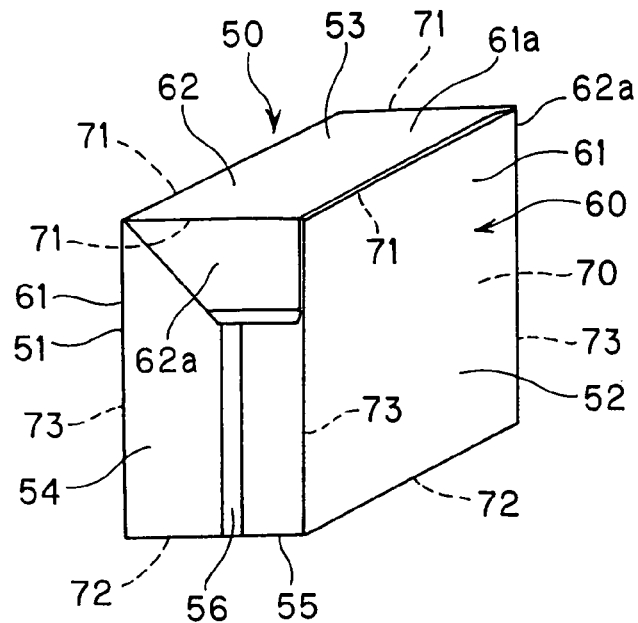
FIG. 13 is a perspective view illustrating the packaging bag manufactured by the method according to the other embodiment of the present invention.
Figure 14:
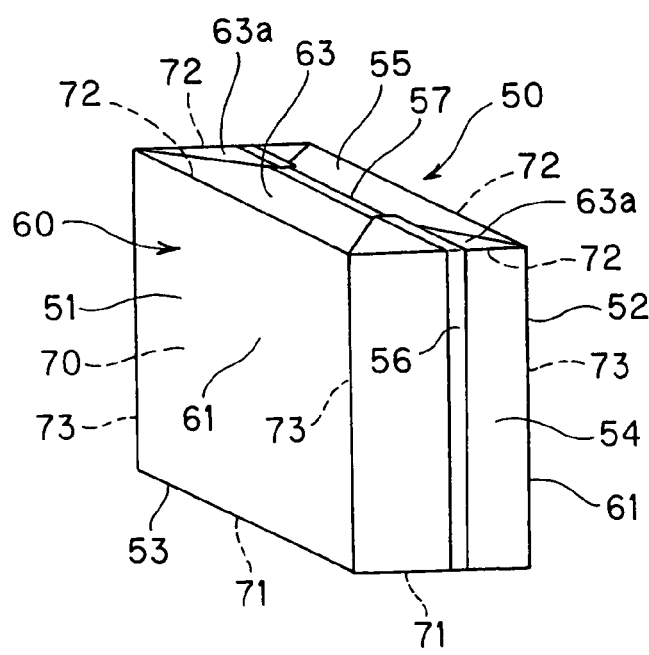
FIG. 14 is a perspective view illustrating the packaging bag as shown in FIG. 13, which is turned upside down.

FIGS. 13 and 14 illustrate the packaging bag 50 manufactured by the method of the second embodiment of the present invention. The packaging bag 50 is different from the packaging bag 1 as shown in FIGS. 1 to 6 in that the former has a heat-sealed portion on the bottom panel portion. The packaging bag 50 is composed of a main bag body 60 formed of plastic film material and a framework member 70, which is joined to the main bag body 60 prior to completion of the formation process thereof. A framework member 70 is folded along bending facilitation portions 73•••73 formed thereon into a rectangular parallelepiped, with the result that the main bag body 60 is also folded into the similar shape. After the packaging bag 50 is filed with contents, the upper portion of the main bag body 60 is folded along the upper edge 71 of the framework member 70 into a flat state to form an overlapped portion 61a. The overlapped portion 61a is then bent toward the rear panel portion 52 to provide a pair of trapezoidal portions 62a, 62a projecting outwardly. The pair of trapezoidal portions 62a, 62a is bent downwardly along the upper edge of the framework member 70 and thermally bonded to the opposite side panel portions 54, 54, respectively, thus providing a finished product, as shown in FIG. 13. The folding process of the upper portion of the packaging bag 50 to form the top panel portion 62 is completed in this manner. Any other suitable bonding may be applicable to the bonding of the trapezoidal portions 62a, 62a, and these portions 62a, 62a may be bonded to the opposite side panel portions 54, 54 by a suitable adhesive agent. Of course, the above-mentioned folding process is carried out after the packaging bag 50 is filled with contents.

FIG. 14 is a perspective view of the packaging bag 50, which is folded and then subjected to the additional folding process to provide the finished product, illustrating the bottom of the packaging bag 50. When the packaging bag 50 is shifted from a generally flat collapsed state to the expanded state, the lower portion of the packaging bag 50 downwardly projects from the lower edge 72 of the framework member 70. The above-mentioned lower portion, which has a bottom heat-sealed portion 57 formed on the lowermost edge thereof so as to extend in the width direction of the packaging bag 50, is folded along the lower edge 72 of the framework member 70 into a flat state so as to provide a pair of triangular portions 63a, 63a extending outwardly. The triangular portions 63a, 63a, which include the opposite side portions of the above-mentioned bottom heat-sealed portion 57, respectively, are bent inwardly along the lower edge 72 of the framework member 70 and thermally bonded to the counterpart, as shown in solid lines in FIG. 14, to form a bottom panel portion 63 of the packaging bag 50. Any other suitable bonding may be applicable to the bonding of the triangular portions 7a, 7a, and these portions 7a, 7a may be bonded to the counterpart by a suitable adhesive agent. The folding process of the lower portion of the packaging bag 50 to form the bottom panel portion 63 is completed in this manner.

Figure 15:
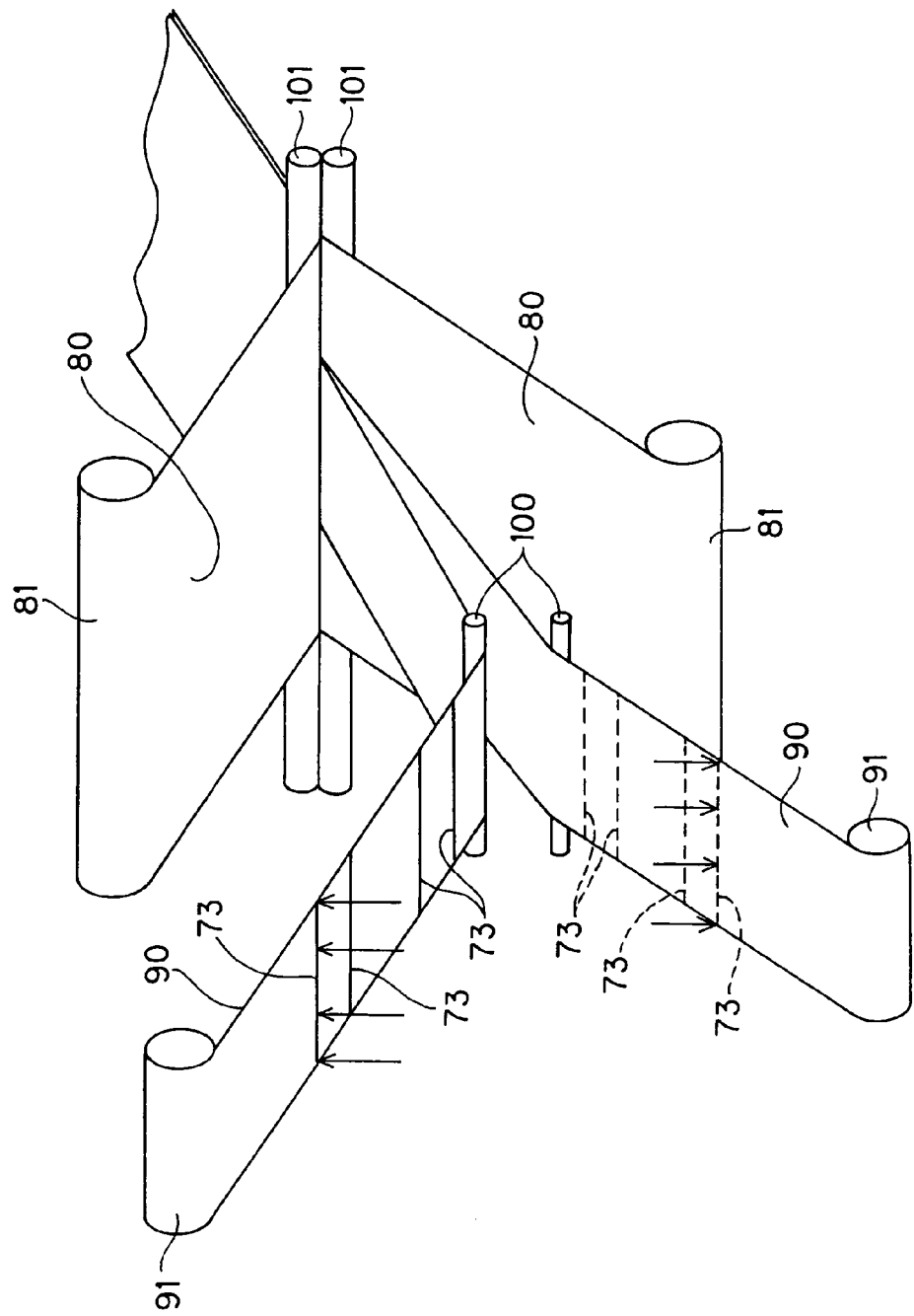
FIG. 15 is a schematic perspective view illustrating a step for continuously feeding a pair of strips of plastic film material for the main bag body, while continuously feeding a pair of strips of thin sheet material for the framework member to place the pair of strips for the framework member on the respective inner surfaces of the pair of strips for the main bag body.

Now, a method of the second embodiment of the present invention for manufacturing the above-described packaging bag 50 will be described below with reference to FIGS. 15 to 17.

In the second embodiment of the method of the present invention, the pair of strips 80, 80 for the main bag body 60 and the pair of strips 30, 30 for the framework member 10 are used to manufacture the plurality of packaging bags 50.

More specifically, the method for manufacturing the packaging bag 50 includes the essential steps of:

(2-a) continuously feeding a pair of strips 80, 80 of plastic film material for the main bag body 60 in a longitudinal direction so as to be apart from each other;

(2-b) continuously feeding a pair of strips 90, 90 of thin sheet material for the framework member 70 to place the pair of strips 90, 90 for the framework member 70 on respective inner surfaces of the pair of strips 80, 80 for the main bag body 60 in predetermined positions thereof;

(2-c) bonding the pair of strips 90, 90 for the framework member 70 to the pair of strips 80, 80 for the main bag body 60, respectively;

(2-d) bringing one of the pair of strips 80, 80 for the main bag body 60 close to another of the pair of strips 80, 80 for the main bag body 60 so as to cause the pair of strips 80, 80 for the framework member face 70 each other, thus preparing a set of composite strips;

(2-e) thermally bonding the set of composite strips in a perpendicular direction to a longitudinal direction thereof by predetermined intervals to form side heat-sealed portions 56•••56;

(2f) thermally bonding the set of composite strips on the lower longitudinal edges of the set of composite strips to form a bottom heat-sealed portion 57; and (2-g) cutting each of the side heat-sealed portions 56•••56 in two in the perpendicular direction to the longitudinal direction of the set of composite strips, and further includes optional steps of:

(2-i) prior to said step (2-b), forming bending facilitation portions 73•••73 on each of the pair of strips 90, 90 for the framework member 70 so as to extend in a perpendicular direction to a feeding direction of the pair of strips 90, 90 for the framework member 70; and (2-j) during the step (2-a), providing a set of male members (not shown) and a set of female members (not shown) in each of the respective consecutive regions for the packaging bags on the pair of strips 80, 80 for the main bag body 60.

First, the step (2-a) is carried out to unroll the pair of strips 80, 80 for the main bag body 60 from the rolled strips 81, 8a to continuously feed them in the longitudinal direction so as to be apart from each other. The strips 80, 80 pass through between a pair of pressing rollers 101, 101 so as to come into contact with each other, as shown in FIG. 15. The layer structure of each of the strips 80, 80 for the main bag body 60 is the same as that of the main bag body 2 of the packaging bag 1 of the present invention as described above and description of the layer structure is therefore omitted.

The step (2-j) is carried out to continuously provide a set of male members (not shown) and a set of female members (not shown) in each of the respective consecutive regions for the packaging bags on the pair of strips 80, 80 for the main bag body 60. The step (2-j) is carried out on the upstream side of the above-mentioned pressing rollers 101, 101 relative to the feeding direction of the strips 80, 80 for the main bag body 60. The step (2-j) is identical to the step (1-h) described above of the first embodiment of the method of the present invention and the detailed description of the step (2-j) is therefore omitted.

The step (2-b) is carried out to unroll the pair of strips 90, 90 for the framework member 70 from the rolled strips 91, 91 to place them between the pair of strips 80, 80 for the main bag body 60 so that the pair of strips 90, 90 for the framework member 70 is located on respective inner surfaces of the pair of strips 80, 80 for the main bag body 60 in predetermined positions thereof. As a result, the pair of strips 90, 90 for the framework member 70 passes through between the above-mentioned pressing rollers 101, 101 together with the pair of strips 80, 80 for the main bag body 60 to carry out the step (2-d) to bring one of the pair of strips 80, 80 for the main bag body 60 close to another of the pair of strips 80, 80 for the main bag body 60 so as to cause the pair of strips 80, 80 for the framework member face 70 each other, thus preparing a set of composite strips. The pair of strips 90, 90 for the framework member 70 is guided by means of a pair of guide rollers 100, 100, as shown in FIG. 15. The layer structure of each of the strips 90, 90 for the framework member 70 is the same as that of the framework member 10 of the packaging bag 1 of the present invention as described above and description of the layer structure is therefore omitted.

Figure 16:
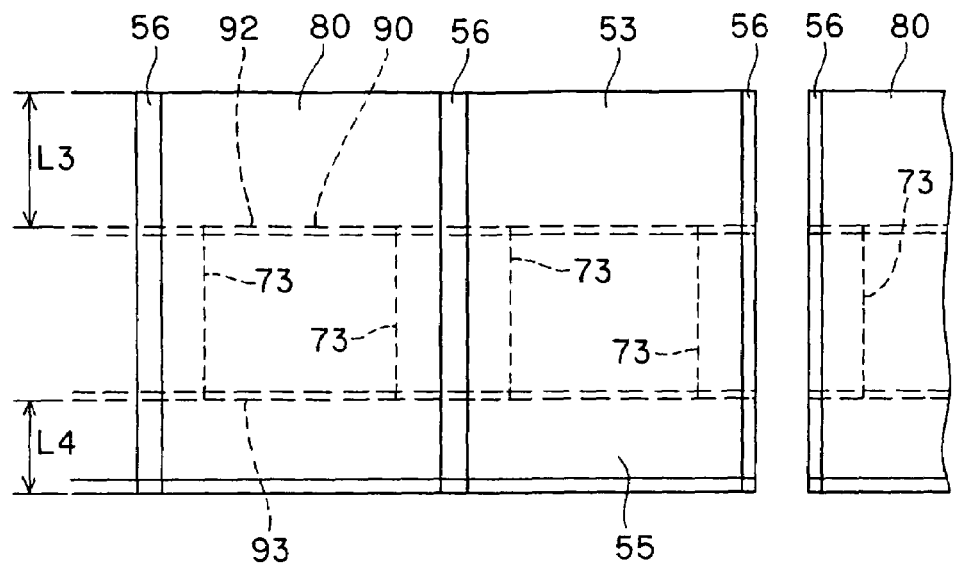
FIG. 16 is a schematic descriptive view illustrating a step for thermally bonding a set of composite strips of the pair of strips for the main bag body and the pair of strips for the framework member in a perpendicular direction to a longitudinal direction thereof by predetermined intervals to form side heat-sealed portions, a step for thermally bonding the set of composite strips on one of longitudinal edges of the set of composite strips to form a bottom heat-sealed portion, and a step for cutting each of the heat-sealed portions in two in the perpendicular direction to the longitudinal direction of the set of composite strips.
Figure 17:
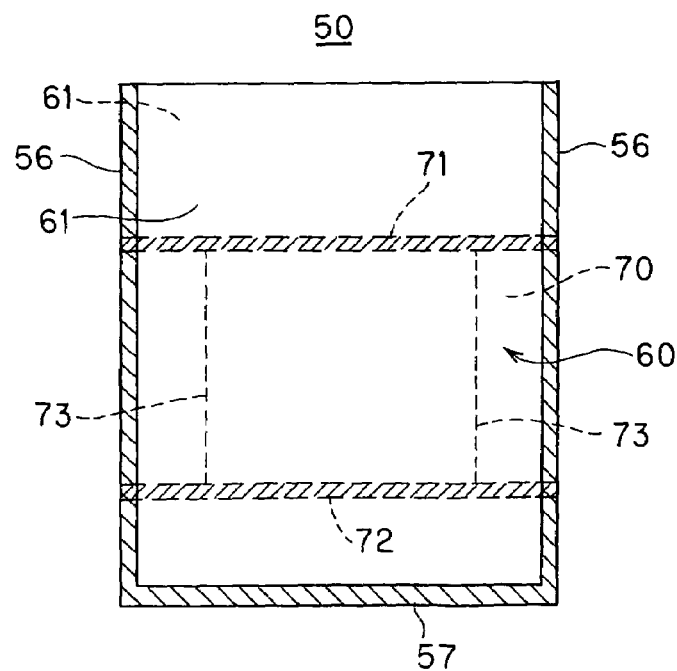
FIG. 17 is a plan view illustrating the packaging bag kept in a flat collapsed state, which is manufactured through completion of the steps as shown in FIG. 16.

As is clear from FIG. 16, the positional determination of each of the strips 90, 90 for the main bag body 60 is made so as to keep a distance "L4" between the lower edge of the strips 80, 80 for the main bag body 60 and the lower edge of each of the strips 90, 90 and a distance "L3" between the upper edge of the each of the strips 90, 90 and the upper edge of the strips 80, 80 for the main bag body 60. The lower portion of the strips 80, 80 for the main bag body 60, which corresponds to the distance "L4", is used to form the bottom panel portions 55 of the packaging bags 50, as shown in FIG. 14. The upper portion of the strips 80, 80 for the main bag body 60, which corresponds to the distance "L3", is used to form the top panel portions 53 of the packaging bags 50, as shown in FIG. 13.

Before the pair of strips 90, 90 for the framework member 70 reaches the above-mentioned guide rollers 100, 100, the step (2-i) is carried out to form the bending facilitation portions 73•••73 on the opposite inner surfaces of the pair of strips 90, 90 for the framework member 70 so as to extend in the perpendicular direction to the feeding direction of the pair of strips 90, 90 for the framework member 70. The step (2-i) is identical to the step (1-g) described above of the first embodiment of the method of the present invention and the detailed description of the step (2-i) is therefore omitted.

The step (2-c) is carried out to thermally bond the pair of strips 90, 90 for the framework member 70 on the opposite longitudinal edge portions thereof to the pair of strips 80, 80 for the main bag body 60, respectively. The step (2-c) is conducted on the downstream side of the pressing rollers 101, 101 relative to the feeding direction of the strips 80, 80 for the main bag body 60.

In addition, the step (2-e) is carried out to thermally bond the combination of the pair of strips 80, 80 for the main bag body 60 with the pair of strips 90, 90 for the framework member 70, i.e., the set of composite strips in a perpendicular direction to the longitudinal direction thereof by predetermined intervals to form side heat-sealed portions 56•••56.

The step (2-f) is also carried out to thermally bond the set of composite strips on the lower longitudinal edges of the set of composite strips to form a bottom heat-sealed portion 57.

Then, the step (2-g) is carried out to cut each of the side heat-sealed portions 56•••56 in two in the perpendicular direction to the longitudinal direction of the set of composite strips, thereby continuously manufacturing the plurality of packaging bags 50. In each of the packaging bags 50, the opposite side edges of the reinforcing section of the framework member 70, which are in parallel with the bending facilitation portions 73, 73 are embedded in the side heat sealed portions 56, 56, as shown in FIG. 17.

In the above-described method of the present invention, the steps (2-a) to (2-j) are carried out on the manufacturing line. The steps (2-a) to (2-j) may however be carried out independently each other on the different manufacturing lines.

In the above-described second embodiment of the method of the present invention, the step (2-i) may be modified in the same manner as the step (1-g) of the method of the first embodiment of the present invention.

In the above-described second embodiment of the method of the present invention, the step (2-j) may be modified in the same manner as the step (1-h) of the method of the first embodiment of the present invention.

The above-described second embodiment of the method of the present invention includes the step (2-j) to provide the sets of male members 5a and the sets of female members 5b on the pair of strips 80, 80 for the main bag body 60. The step (2-j) may however be omitted, as an occasion demands.

In the above-described second embodiment of the method of the present invention, the width of the pair of strips 80, 80 for the main bag body 60 is substantially identical to the height of the packaging bag 50. Accordingly, each of the consecutive steps (2-g), i.e., the single cutting operation provides the single packaging bag 50. However, there may be adopted a modification in which the width of each of the pair of strips 80, 80 for the main bag body 60 is increased so that a plurality of main bag bodies 60 can be allocated in a region of the strip 80, which extends over the entire width thereof, on the one hand, and a plurality of pairs of strips 90, 90 for the framework member 70 is fed, on the other hand.

Now, description will be given of an example of such modification in which three main bag bodies are allotted in a region of the strip 80, which extends over the entire width thereof, with reference to FIGS. 18 and 19.

Figure 18:
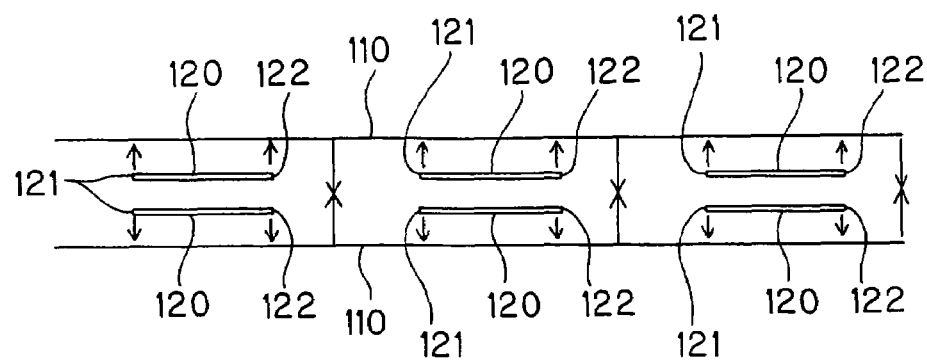
FIG. 18 is a schematic sectional view illustrating the modification of the method of the present invention, in which a set of three packaging bags can be provided in a region of the set of composite strips, which extends in the perpendicular direction to the feeding direction of the set of composite strips.

FIG. 18 is a schematic sectional view illustrating the modification of the method of the present invention, in which a set of three packaging bags can be provided in a region of the set of composite strips, which extends in the perpendicular direction to the feeding direction of the set of composite strips. The horizontal direction in FIG. 18 corresponds to the width direction, i.e., the perpendicular direction to the feeding direction of the pair of strips 110, 110 for the main bag body.

Each of the pair of strips 110, 110 for the main bag body has a width three times as much as the width of the packaging bag 50 to be manufactured. These strips 110, 110 are fed in their longitudinal directions so as to be apart from each other in the similar manner to the step (2-a) of the above-described second embodiment of the method of the present invention.

Three pairs of strips 120, 120 for the framework member are also fed in their longitudinal directions so as to be placed between the above-mentioned pair of strips 110, 110 for the main bag body in the similar manner to the step (2-b) of the above-described second embodiment of the method of the present invention. The three pairs of strips 120, 120 are spaced apart from each other in the width direction of the strips 110, 110 for the main bag body by a predetermined distance.

Figure 19:
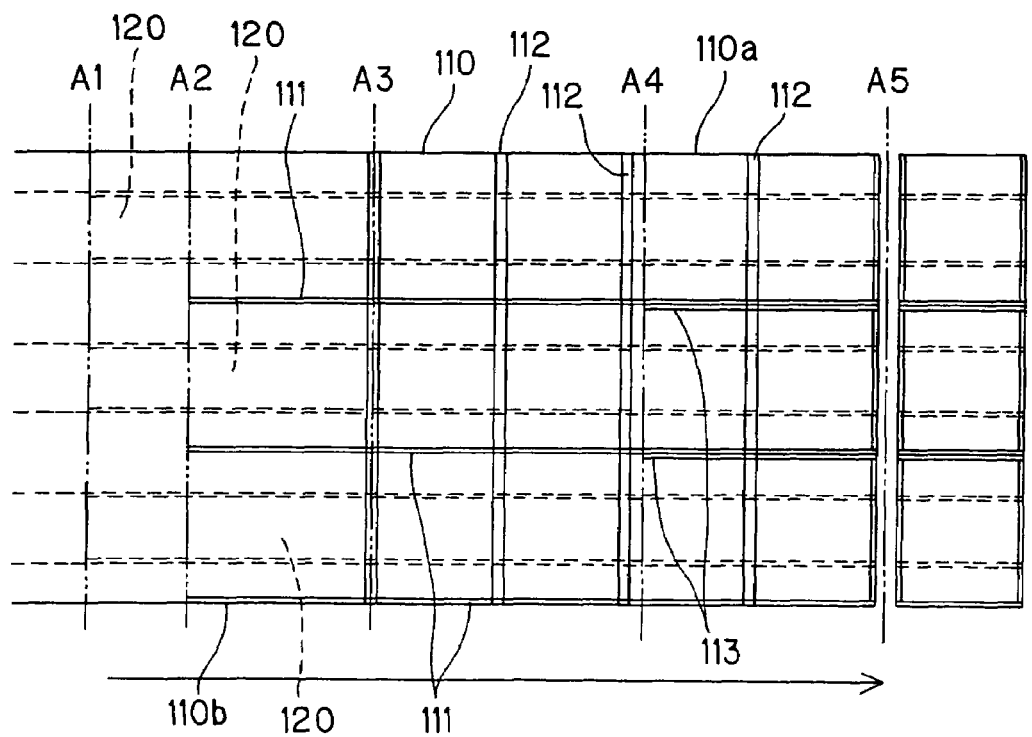
FIG. 19 is a schematic descriptive view illustrating a series of steps of the modification as shown in FIG. 18.

The opposite longitudinal edge portions 121, 122 of the respective strips 120 are thermally bonded to the corresponding strip 110 for the main bag body, and then one of the pair of strips 110, 110 for the main bag body is brought close to another thereof so as to cause one of each pair of strips 120, 120 for the framework member face another thereof to prepare a set of composite strips in the similar manner to the steps (2-c) and (2-d) of the above-described second embodiment of the method of the present invention, as shown in the first region between the two-dot chain straight lines "A1" and "A2" in FIG. 19.

Then, the set of composite strips are thermally bonded in the longitudinal direction at three positions, i.e., the lowermost position of the set of composite strips as shown in FIG. 19 and the additional two positions, which divide the set of composite strips in the width direction (i.e., the vertical direction in FIG. 19) into three equal parts, to form three bottom heat-sealed portions 111, 111, 111 in the similar manner to the step (2-f of the above-described second embodiment of the method of the present invention, as shown in the second region between the two-dot chain straight lines "A2" and "A3" in FIG. 19.

In addition, the set of composite strips are thermally bonded in a perpendicular direction to the longitudinal direction thereof by predetermined intervals to form side heat-sealed portions 112•••112 in the similar manner to the step (2-e) of the above-described second embodiment of the method of the present invention, as shown in the third region between the two-dot chain straight lines "A3" and "A4" in FIG. 19. Each of the thus formed side heat-sealed portions 112•••112 extends over the set of composite strips in the width direction thereof. Areas defined by the bottom heat-sealed portions 111, 111, 111 and the side heat-sealed portions 112•••112 are to form the respective packaging bags.

Then, the set of composite strips thus heat-sealed are cut in the longitudinal direction at two positions into three semi-finished strips for the packaging bags, as shown in the fourth region between the two-dot chain straight lines "A4" and "A5" in FIG. 19. These two positions are located directly below the above-mentioned additional two positions for the thermal bonding, which divide the set of composite strips in the width direction into three equal parts, as shown in FIG. 19. As a result, the resultant three semi-finished strips for the packaging bags have substantially the same width. Each of the thus prepared semi-finished strips for the packaging bags is formed into a chain of packaging bags. The above-described second embodiment of the method of the present invention does not include such a cutting step.

Then, each of the semi-finished strips for the packaging bags is subjected to a further cutting step to cut each of the side heat-sealed portions 112•••112 in two in the perpendicular direction to the longitudinal direction of the semi-finished strip, thereby manufacturing a plurality of independent packaging bags.

The above-described modification of the method of the present invention makes it possible to improve remarkably the manufacturing efficiency.

The above-described embodiments of the method of the present invention and the modification thereof provide the continuous manufacture of the plurality of packaging bags. The method of the present invention may be worked in the form of batch manufacturing system in a manner as described below.

Figure 20:
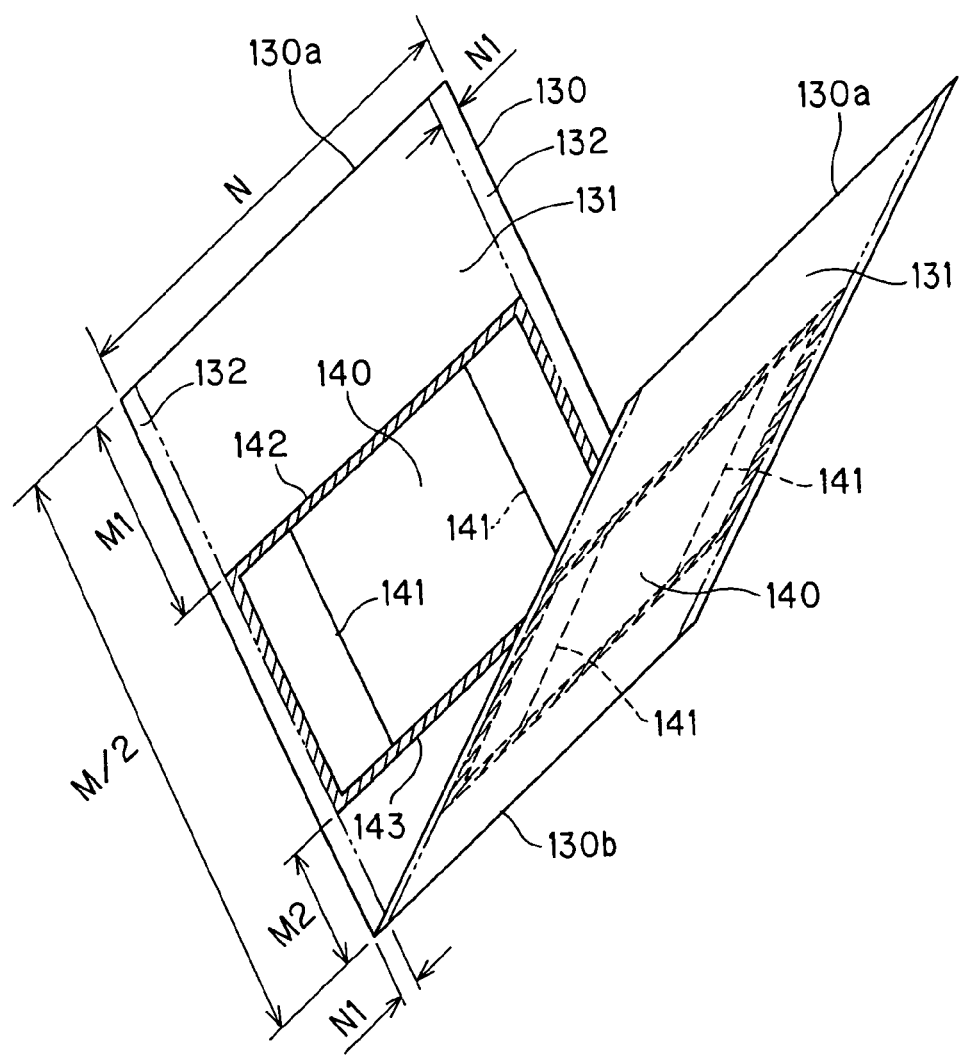
FIG. 20 is a schematic descriptive view illustrating the method according to the other embodiment of the present invention, which utilizes a single piece of plastic film for the main bag body and a pair of pieces of thin sheet material for the framework member in order to manufacture the single packaging bag.

Now, the method of the third embodiment of the present invention for manufacturing the above-described packaging bag will be described below with reference to FIG. 20.

In the third embodiment of the method of the present invention, the single piece for the main bag body and the pair of pieces 140, 140 for the framework member are used to manufacture the single packaging bags.

More specifically, the method for manufacturing the packaging bag includes the essential steps of:

(3-a) preparing a single piece of plastic film material for a main bag body, the single piece having opposite half portions 131, 131 between which a central line 130*b* of the single piece exists;

(3-b) placing a pair of pieces 140, 140 of thin sheet material for a framework member on a surface of the single piece for the main bag body in predetermined positions of the respective opposite half portions 131, 131 of the single piece;

(3-c) bonding the pair of pieces 140, 140 for the framework member to the single piece for the main bag body in respective opposite half portions 131, 131 thereof;

(3-d) folding the single piece for the main bag body with the pair of pieces for the framework member in two along the central line 130*b* of the single piece for the main bag body to bring one of the opposite half portions 131, 131 of the single piece for the main bag body close to another of the opposite half portions 131, 131 to prepare a folded composite piece so that the pair of pieces 140, 140 for the framework member are placed in an inside of the folded composite piece; and (3-e) thermally bonding the folded composite piece on opposite sides thereof to form heat-sealed portions, and further includes optional steps of:
(3-f) prior to the step (b), forming bending facilitation portions on each of the pair of pieces for the framework member; and
(3-g) providing a set of male members (not shown) and a set of female members (not shown) in each of the opposite longitudinal sides of the single piece for the main bag body so as to extend in the width direction thereof.

First, the step (3-a) is carried out to prepare the single piece of plastic film material for the main bag body. Such a piece for the main bag body is formed into a rectangular shape provided with a long side having a length of "M" and a short side having a length of "N". FIG. 20 illustrates the piece for the main bag body, which is semi-folded in two, with the result that FIG. 20 includes the indication of "M/2". The piece for the main bag body has the opposite half portions 131, 131 between which the central line 130b of the single piece exists. The layer structure of the piece for the main bag body 60 is the same as that of the main bag body 2 of the packaging bag 1 of the present invention as described above and description of the layer structure is therefore omitted.

The step (3-g) is carried out to provide a set of male members (not shown) and a set of female members (not shown) on the respective half portions of the piece for the main bag body so as to extend in the width direction on the opposite portions of the long side of the piece for the main bag body. The step (3-g) is similar to the step (1-h) described above of the first embodiment of the method of the present invention and the detailed description of the step (3-g) is therefore omitted.

The pair of pieces 140, 140 for the framework member is prepared. Each of the pieces 140, 140 has a smaller width than the width of the piece for the main bag body, i.e., the short side having the length of "N", by a length twice as much as the width "N1" of a portion 132 to be thermally bonded of the piece for the main bag body, as shown in FIG. 20. The layer structure of each of the pieces 140, 140 for the framework member is the same as that of the framework member 10 of the packaging bag 1 of the present invention as described above and description of the layer structure is therefore omitted.

The thus prepared pieces 140, 140 for the framework member is subjected, prior to the step (3-b) described later, to the step (3-f) to form a pair of bending facilitation portions 141 on each of the pair of pieces 140, 140 for the framework member in the similar manner as the step (1-g) described above of the first embodiment of the method of the present invention. Each of the pieces 140, 140 has the first pair of opposite side edges (i.e., the right-hand and left-hand side edges) and the second pair of opposite side edges (i.e., the upper and lower side edges) 142, 143. The bending facilitation portion 141 extends in parallel to the right-hand and left-hand side edges of the piece 140 for the framework member, as shown in FIG. 20.

Then, the step (3-b) is carried out to place the pair of pieces 140, 140 of thin sheet material for the framework member on the surface of the single piece for the main bag body in the predetermined positions of the respective opposite half portions 131, 131. The piece 140 is placed on the half portion 131 in the predetermined position so as to keep a distance "M1" between the upper edge 142 of the piece 140 and one of the opposite short side edges of the single piece for the main bag body and a distance "M2" between the lower edge of the piece 140 and the central line 130b of the single piece. The same positional determination of the piece 140 relative to the half portion 131 of the single piece for the main bag body is also made on the other half portion 131 thereof.

Then, the step (3-c) is carried out to thermally bond the pair of pieces 140, 140 for the framework member to the single piece for the main bag body in the respective opposite half portions 131, 131 thereof. The pieces 140, 140 are thermally bonded at their periphery as hatched in FIG. 20 to the respective half portions 131, 131 of the single piece for he main bag body.

Then, the step (3-d) is carried out to fold the single piece for the main bag body with the pair of pieces 140, 140 for the framework member in two along the central line 130b of the single piece for the main bag body to bring one of the opposite half portions 131, 131 of the single piece for the main bag body close to another of the opposite half portions 131, 131 to prepare a folded composite piece so that the pair of pieces 140, 140 for the framework member are placed in an inside of the folded composite piece.

Then, the step (3-e) is carried out to thermally bond the folded composite piece on opposite sides thereof, i.e., at the portions 132, 132 to form heat-sealed portions having the width of "N1", thereby manufacturing the packaging bag. The thus manufactured packaging bag is composed of the main bag body formed of the single piece and the pair of reinforcing sections formed of the pair of pieces 140, 140. The right-hand and left-hand side edges (i.e., the first pair of opposite side edges) of the reinforcing section 140 and the upper and lower side edges (i.e., the second pair of opposite side edges) thereof are thermally bonded to the main bag body at other regions than the pair of side heat-sealed portions.

The packaging bag is shifted to an expanded state and subjected to a bending finishing step to provide a finished product in the form of a rectangular parallelepiped in the same manner as the packaging bag as described above and illustrated in FIGS. 1 to 6.

Figure 21:
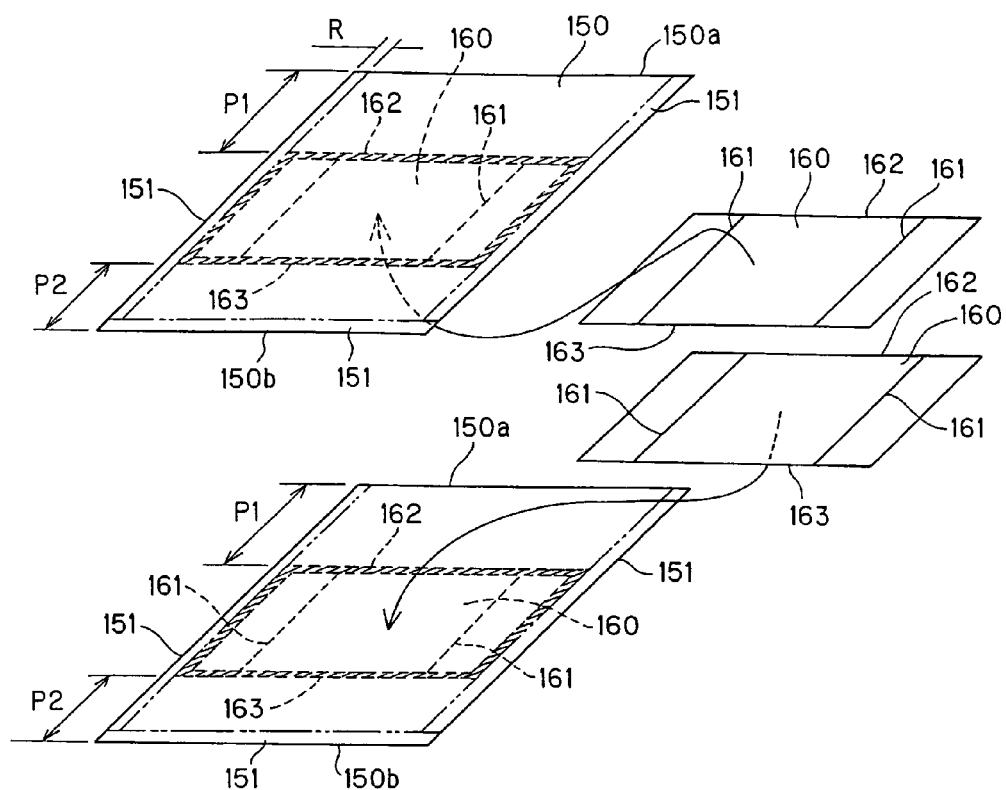
FIG. 21 is a schematic descriptive view illustrating the method according to the other embodiment of the present invention, which utilizes a pair of pieces of plastic film for the main bag body and a pair of pieces of thin sheet material for the framework member in order to manufacture the single packaging bag.

Now, the method of the fourth embodiment of the present invention for manufacturing the packaging bag will be described below with reference to FIG. 21.

In the fourth embodiment of the method of the present invention, the pair of pieces 150, 150 for the main bag body and the pair of pieces 140, 140 for the framework member are used to manufacture the single packaging bags.

More specifically, the method for manufacturing the packaging bag includes the essential steps of:
(4-a) placing a pair of pieces 150, 150 of plastic film material for the main bag body so as to be apart from each other;
(4-b) placing a pair of pieces 160, 160 of thin sheet material for the framework member on respective inner surfaces of the pair of pieces 150, 150 for the main bag body in predetermined positions thereof;
(4-c) bonding the pair of pieces 160, 160 for the framework member to the pair of pieces 150, 150 for the main bag body, respectively;
(4-d) bringing one of the pair of pieces 150, 150 for the main bag body close to another of the pair of pieces 150, 150 for the main bag body so as to cause the pair of pieces 160, 160 for the framework face each other, thus preparing a set of composite pieces; and
(4-e) thermally bonding the set of composite pieces at opposite side edges and a bottom edge thereof to form side heat-sealed portions and a bottom heat-sealed portion;
and further includes optional steps of:
(4-f) prior to the step (b), forming bending facilitation portions on each of the pair of pieces for the framework member; and
(4-g) providing a set of male members (not shown) and a set of female members (not shown) in each of the pair of pieces 150, 150 for the main bag body so as to extend in the width direction thereof.

First, the step (4-a) is carried out to place the pair of pieces 150, 150 of plastic film material for the main bag body so as to be apart from each other. Each of the pieces 150, 150 for the main bag body has the same rectangular shape. The layer structure of the pieces 150, 150 for the main bag body is the same as that of the main bag body 2 of the packaging bag 1 of the present invention as described above and description of the layer structure is therefore omitted.

The step (4-g) is carried out to provide a set of male members (not shown) and a set of female members (not shown) in each of the pair of pieces 150, 150 for the main bag body so as to extend in the width direction thereof. The step (4-g) is similar to the step (1-h) described above of the first embodiment of the method of the present invention and the detailed description of the step (4-g) is therefore omitted.

The pair of pieces 160, 160 for the framework member is prepared. Each of the pieces 160, 160 has a smaller width than the width of each of the pieces 150, 150 for the main bag body by a length twice as much as the width "R" of a portion 151 to be thermally bonded of the piece for the main bag body, as shown in FIG. 21. The layer structure of each of the pieces 160, 160 for the framework member is the same as that of the framework member 10 of the packaging bag 1 of the present invention as described above and description of the layer structure is therefore omitted.

The thus prepared pieces 160, 160 for the framework member is subjected, prior to the step (4-b) described later, to the step (4-f) to form a pair of bending facilitation portions 161, 161 on each of the pair of pieces 160, 160 for the framework member in the similar manner as the step (1-g) described above of the first embodiment of the method of the present invention. Each of the pieces 160, 160 has the first pair of opposite side edges (i.e., the right-hand and left-hand side edges) and the second pair of opposite side edges (i.e., the upper and lower side edges) 162, 163. The bending facilitation portion 161 extends in parallel to the right-hand and left-hand side edges of the piece 160 for the framework member, as shown in FIG. 21.

Then, the step (4-b) is carried out to place the pair of pieces 160, 160 for the framework member on respective inner surfaces of the pair of pieces 150, 150 for the main bag body in predetermined positions thereof. The piece 160 is placed on the piece 150 in the predetermined position so as to keep a distance "P1" between the upper edge 162 of the piece 160 and one of the opposite short side edges of the piece 150 for the main bag body and a distance "P2" between the lower edge of the piece 160 and the other the opposite short side edges of the piece 150 for the main bag body. The same positional determination of the piece 160 relative to the other piece for the main bag body is also made.

Then, the step (4-c) is carried out to thermally bond the pair of pieces 160, 160 for the framework member to the pair of pieces 150, 150 for the main bag body, respectively. The pieces 160, 160 are thermally bonded at their periphery as hatched in FIG. 21 to the respective pieces 150, 150 for he main bag body.

Then, the step (4-d) is carried out to bring one of the pair of pieces 150, 150 for the main bag body close to another of the pair of pieces 150, 150 for the main bag body so as to cause the pair of pieces 160, 160 for the framework face each other, thus preparing a set of composite pieces.

Then, the step (4-e) is carried out to thermally bond the set of composite pieces at opposite side edges 151, 151 and a bottom edge 151 thereof to form side heat-sealed portions and a bottom heat-sealed portion, thereby manufacturing the packaging bag. The thus manufactured packaging bag is composed of the main bag body formed of the pair of pieces 150, 150 and the pair of reinforcing sections formed of the pair of pieces 160, 160. The right-hand and left-hand side edges (i.e., the first pair of opposite side edges) of the reinforcing section 160 and the upper and lower side edges (i.e., the second pair of opposite side edges) thereof are thermally bonded to the main bag body at other regions than the pair of side heat-sealed portions.

The packaging bag is shifted to an expanded state and subjected to a bending finishing step to provide a finished product in the form of a rectangular parallelepiped in the same manner as the packaging bag as described above and illustrated in FIGS. 1 to 6.

Figure 22:
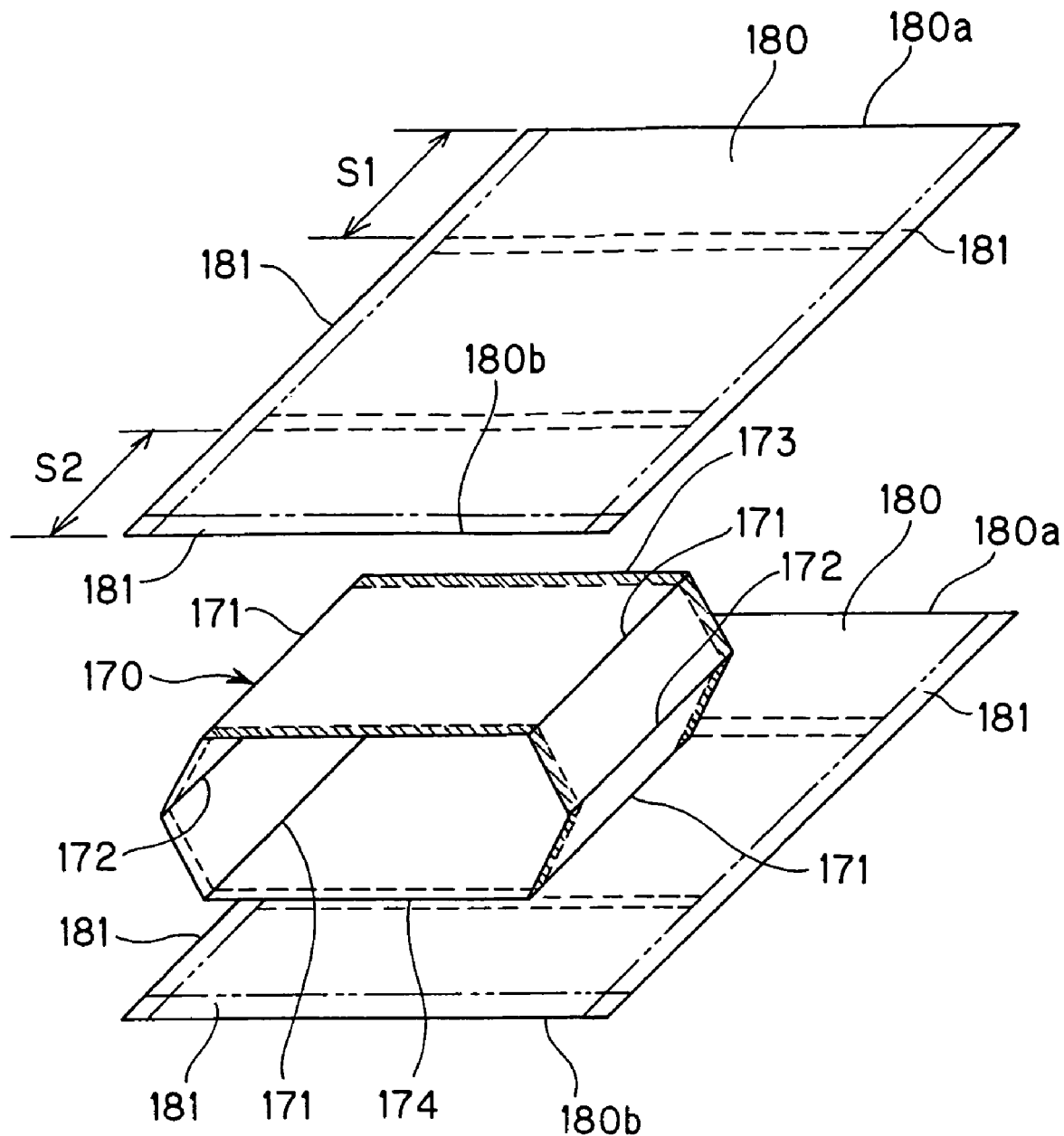
FIG. 22 is a schematic descriptive view illustrating the method according to the other embodiment of the present invention, which utilizes a pair of pieces of plastic film for the main bag body and a sleeve serving as the framework member in order to manufacture the single packaging bag.

Now, the method of the fifth embodiment of the present invention for manufacturing the packaging bag will be described below with reference to FIG. 22.

In the fifth embodiment of the method of the present invention, the pair of pieces 180, 180 for the main bag body and a framework member 170, which is formed into a sleeve, are used to manufacture the single packaging bags.

More specifically, the method for manufacturing the packaging bag includes the essential steps of:
(5-a) placing a pair of pieces 180, 180 of plastic film material for a main bag body so as to be apart from each other;
(5-b) placing a framework member 170, which is formed into a sleeve, on respective inner surfaces of the pair of pieces 180, 180 for the main bag body in predetermined positions thereof;
(5-c) bonding the framework member 170 to the pair of pieces 180, 180 for the main bag body, respectively;
(5-d) bringing one of the pair of pieces 180, 180 for the main bag body close to another of the pair of pieces 180, 180 for the main bag body so as to receive the framework 170 between the pair of pieces 180, 180 for the main bag body, thus preparing a set of composite pieces; and
(5-e) thermally bonding the set of composite pieces at opposite side edges and a bottom edge thereof to form side heat-sealed portions and a bottom heat-sealed portion;
and further includes optional steps of:
(5-f) prior to the step (b), forming bending facilitation portions on the framework member; and
(5-g) providing a set of male members (not shown) and a set of female members (not shown) in each of the pair of pieces 150, 150 for the main bag body so as to extend in the width direction thereof.

First, the step (5-a) is carried out to place the pair of pieces 180, 180 of plastic film material for the main bag body so as to be apart from each other. Each of the pieces 180, 180 for the main bag body has the same rectangular shape. The layer structure of the pieces 180, 180 for the main bag body is the same as that of the main bag body 2 of the packaging bag 1 of the present invention as described above and description of the layer structure is therefore omitted.

The step (5-g) is carried out to provide a set of male members (not shown) and a set of female members (not shown) in each of the pair of pieces 180, 180 for the main bag body so as to extend in the width direction thereof. The step (5-g) is similar to the step (1-h) described above of the first embodiment of the method of the present invention and the detailed description of the step (5-g) is therefore omitted.

The framework member 170 is prepared in the form of sleeve, which has openings on the upper and lower sides thereof. The framework member 170, which is formed of a piece of plastic material, is composed of the pair of opposite reinforcing sections each having the same rectangular shape. The opposite reinforcing sections are combined to each other by means of a pair of bending facilitation portions 172, 172, which extend in the opening direction of the sleeve, i.e., the framework member 170. In addition, each of the opposite reinforcing sections has the other pair of bending facilitation portions 171, 171, which extend in parallel with the above-mentioned pair of bending facilitation portions 172, 172 in positions shifted inwardly therefrom by the predetermined distance. The six pending facilitation portions, i.e., the above-described pair of bending facilitation portions 172, 172, the first pair of bending facilitation portions 171, 171 provided in one of the opposite reinforcing sections and the second pair of bending facilitation portions 171, 171 provided in the other thereof enables the framework member 170 to be shifted between a generally flat collapsed state and an expanded state. The width of the framework member 170, which is kept in the generally flat collapsed state, is smaller than the width of each of the pieces 180, 180 for the main bag body by a length twice as much as the width of a side edge portion 181 to be thermally bonded of the piece 180 for the main bag body, as shown in FIG. 22. The layer structure of the plastic material for the framework member is the same as that of the framework member 10 of the packaging bag 1 of the present invention as described above and description of the layer structure is therefore omitted.

The above-described framework member 10 is obtained by carrying out the step (5-f) to form the bending facilitation portions 171, 171, 171, 171, 172, 172 on the elongated piece of plastic material for the framework member 170 and then the further additional step for bringing one edge of the above-mentioned piece for the framework member 170 close to the other edge thereof and combining these edges to each other. The step (5-f) is carried out in the similar manner as the step (1-g) described above of the first embodiment of the method of the present invention. The connection portion in which the opposite edges of the piece for the framework member 170 is connected to each other, may be designed to serve as one of the bending facilitation portions 171, 171, 171, 171, 172, 172.

Then, the step (5-b) is carried out to place the framework member 170, which is kept in the generally flat collapsed state, on respective inner surfaces of the pair of pieces 180, 180 for the main bag body in predetermined positions thereof. The framework member 170 is placed on the piece 180 in the predetermined position so as to keep a distance "S1" between the upper edge 173 of the framework member 170 and one of the opposite short side edges of the piece 150 for the main bag body and a distance "S2" between the lower edge of the framework member 170 and the other the opposite short side edges of the piece 180 for the main bag body. The same positional determination of the framework member 170 relative to the other piece 180 for the main bag body is also made.

Then, the step (5-c) is carried out to thermally bond the framework member 170 to the pair of pieces 180, 180 for the main bag body, respectively. The framework member 170 is thermally bonded at its opposite peripheries as hatched in FIG. 22 to the respective pieces 180, 180 for the main bag body.

Then, the step (5-d) is carried out to bring one of the pair of pieces 180, 180 for the main bag body close to another of the pair of pieces 180, 180 for the main bag body so as to receive the framework 170 between the pair of pieces 180, 180 for the main bag body, thus preparing a set of composite pieces.

Then, the step (5-e) is carried out to thermally bond the set of composite pieces at opposite side edges 181, 181 and a bottom edge 181 thereof to form side heat-sealed portions and a bottom heat-sealed portion, thereby manufacturing the packaging bag. The thus manufactured packaging bag is composed of the main bag body formed of the pair of pieces 180, 180 and the framework member 170, i.e., the sleeve. The portions 181, 181 of the pieces 180, 180 are thermally bonded to form the opposite side heat-sealed portions to which the pair of bending facilitation portions 172, 172 of the framework member 170 are placed to be adjacent.

The packaging bag is shifted to an expanded state and subjected to a bending finishing step to provide a finished product in the form of a rectangular parallelepiped in the same manner as the packaging bag as described above and illustrated in FIGS. 1 to 6.

According to the present invention described above, the packaging bag comprises the main bag body and the framework member, which is joined to the main bag body prior to completion of the main bag body formation process, it is possible to avoid problems when inserting the sleeve into the main bag body in accordance with the prior art so as to facilitate manufacture of the packaging bag, thus reducing the manufacturing cost. It is also possible to provide an excellent external appearance in the expanded state.

According to the method of the present invention, it is possible to manufacture the above-mentioned packaging bag in an effective manner.

The entire disclosure of Japanese Patent Application No. 2002-343845 filed on Nov. 27, 2002 including the specification, claims, drawings and summary is incorporated herein by reference in its entirety.

What is claimed is:

1. A method for manufacturing a packaging bag, comprising the steps of:
   (a) continuously feeding in a longitudinal direction a single strip of plastic film material for a main bag body extending in said longitudinal direction, said single strip having opposite half portions between which a longitudinal central line of said single strip exists, said single strip having a longitudinally-extending area, said longitudinally-extending area including said longitudinal central line for forming a bottom of said main bag body;
   (b) continuously feeding in said longitudinal direction a pair of strips of thin sheet material for a framework member on a surface of said single strip in predetermined positions on the respective opposite half portions of the single strip, said predetermined positions excluding said longitudinally-extending area such that the bottom of the bag body is free from the framework member;
   (c) bonding said pair of strips for the framework member to said single strip for the main bag body in respective opposite half portions thereof;
   (d) folding said single strip for the main bag body with said pair of strips for the framework member in two along said longitudinal central line of said single strip for the main bag body to bring one of said opposite half portions close to another of said opposite half portions such that said pair of strips for the framework member are in an inside of said folded composite strip;
   (e) thermally bonding said folded composite strip in a direction perpendicular to said longitudinal direction by predetermined intervals to form heat-sealed portions;
   (f) cutting each of said heat-sealed portions in two in a direction perpendicular to the longitudinal direction of said folded composite strip, and
   (g) prior to said step (b), forming bending facilitation portions on each of said pair of strips for the framework member, said bending facilitation portions extending in a direction perpendicular to said longitudinal direction,
   thereby continuously manufacturing a plurality of packaging bags each of which comprises the main bag body and the framework member, which is foldable/unfoldable together with said main bag body, to enable said framework member and said main bag body to be shifted between a generally flat collapsed state and an expanded state.

2. The method as claimed in claim 1, wherein:

said steps (a) to (f) are carried out on a manufacturing line.

3. A method for manufacturing a packaging bag, comprising the steps of:
- (a) continuously feeding in a longitudinal direction a pair of strips of plastic film material for a main bag body so as to be apart from each other, each of said pair of strips comprising a longitudinally-extending area including a lower edge of said strip, the pair of said longitudinally-extending areas for forming a bottom of said bag body;
- (b) continuously feeding in said longitudinal direction a pair of strips of thin sheet material for a framework member on respective inner surfaces of said pair of strips for the main bag body in predetermined positions thereof, said predetermined positions excluding said longitudinally-extending areas, such that the bottom of said bag body is free from a framework member;
- (c) bonding said pair of strips for the framework member to said pair of strips for the main bag body, respectively;
- (d) bringing one of said pair of strips for the main bag body close to another of said pair of strips for the main bag body so as to cause said pair of strips for the framework member face each other, thus preparing a set of composite strips;
- (e) thermally bonding said set of composite strips in a direction perpendicular to said longitudinal direction by predetermined intervals to form side heat-sealed portions;
- (f) thermally bonding said set of composite strips on one of longitudinal edges of said set of composite strips to form a bottom heat-sealed portion; and
- (g) cutting each of said side heat-sealed portions in two in said direction perpendicular to the longitudinal direction of said set of composite strips, and (h) prior to said step (b), forming bending facilitation portions on each of said pair of strips for the framework member, said bending facilitation portions extending in a direction perpendicular to said longitudinal direction, thereby continuously manufacturing a plurality of packaging bags each of which comprises the main bag body and the framework member, which is foldable/unfoldable together with said main bag body, to enable said framework member and said main bag body to be shifted between a generally flat collapsed state and an expanded state.

4. The method as claimed in claim 3, wherein:

said steps (a) to (g) are carried out on a manufacturing line.

* * * * *